(12) United States Patent
Kawashima et al.

(10) Patent No.: US 8,116,366 B2
(45) Date of Patent: Feb. 14, 2012

(54) DELAYED DECISION FEEDBACK SEQUENCE ESTIMATOR

(75) Inventors: Toshitsugu Kawashima, Kanagawa (JP); Mark Horowitz, Menlo Park, CA (US)

(73) Assignees: Renesas Electronics Corporation, Kawasaki-shi, Kanagawa (JP); The Board of Trustees of the Leland Stanford Junior University, Palo Alto, CA (US)

( * ) Notice: Subject to any disclaimer, the term of this patent is extended or adjusted under 35 U.S.C. 154(b) by 877 days.

(21) Appl. No.: 12/149,157

(22) Filed: Apr. 28, 2008

(65) Prior Publication Data

US 2009/0268804 A1 Oct. 29, 2009

(51) Int. Cl.
*H03H 7/30* (2006.01)
*H03K 5/159* (2006.01)
(52) U.S. Cl. .......................... 375/233; 375/234; 375/236
(58) Field of Classification Search .................. 375/233, 375/231, 234, 265, 341
See application file for complete search history.

(56) References Cited

U.S. PATENT DOCUMENTS

| 5,946,345 | A  | * | 8/1999 | Karlsson et al. | ............. | 375/150 |
| 6,690,739 | B1 | * | 2/2004 | Mui | .............................. | 375/265 |
| 7,027,544 | B2 | * | 4/2006 | Vaucher | ........................ | 375/355 |
| 7,362,800 | B1 | * | 4/2008 | Zerbe et al. | .................... | 375/226 |
| 7,697,642 | B2 | * | 4/2010 | Kim | ............................... | 375/341 |
| 2007/0168847 | A1 | * | 7/2007 | Pisek et al. | .................... | 714/795 |

\* cited by examiner

*Primary Examiner* — Khanh C Tran
*Assistant Examiner* — Qutbuddin Ghulamali
(74) *Attorney, Agent, or Firm* — McGinn IP Law Group, PLLC

(57) ABSTRACT

Disclosed is a delayed decision feedback sequence estimator comprising a delayed decision feedback sequence estimator main unit including DDFSE computing unit group including (L+M) DDFSE computing units, equal in number to a length of each of plurality of blocks into which a received data symbol sequence is divided; wherein (L+M) DDFSE computing units are connected in a pipeline configuration to execute delayed decision feedback sequence estimation of the blocks in parallel; and an edge effect detection and correction circuit that detects an edge effect due to processing the delayed decision feedback sequence estimation of the separated block and corrects a relevant bit error.

8 Claims, 23 Drawing Sheets

DELAYED DECISION FEEDBACK SEQUENCE ESTIMATOR

FIELD OF THE INVENTION

This invention relates to a sequence estimation system for received data in high speed data communications, and in particular to speeding up technique of processing of a delayed decision feedback sequence estimator.

BACKGROUND OF THE INVENTION

In a receiving side of a high speed data transmission system, when distinguishing transmitted data from received symbols disturbed by Inter-symbol Interference (hereinafter referred to as ISI) and Additive White Gaussian Noise (hereinafter referred to as AWGN), energy of the received symbols can be utilized to the greatest effect in signal determination by using Maximum Likelihood Sequence Estimation (MLSE) so that a best error rate can be theoretically realized. In maximum likelihood sequence estimation, it is known that a Viterbi decoder enables efficient circuit implementation. However, if ISI occurs over many symbols, the number of states of the Viterbi decoder becomes very large and circuit implementation cannot be feasible with realistic complexity.

For example, in case of transmission of binary data symbols is transmitted via a transmission path in which ISI occurs across a range of 10 symbols, the number of states of the Viterbi decoder becomes 1024, and implementation of a circuit that operates in a GHz band is impossible.

As a technique for reducing the number of states of the Viterbi decoder, a series of technologies referred to as Reduced State Sequence Estimation (RSSE) is known.

In particular, in reducing the number of states of the Viterbi decoder when the ISI occurs across many symbols, a delayed decision feedback sequence estimator (hereinafter referred to as DDFSE) which reduces the number of states of the Viterbi decoder by combining the Viterbi decoder and a decision feedback equalizer, is effective. Regarding theoretical details of the DDFSE, reference may be done to Non-Patent Document 1 ("Delayed Decision-Feedback Sequence Estimation", by Alexandra Duel-Hallen and Chris Heegard, 1989, IEEE Transactions on Communications).

FIG. 20 is a diagram illustrating the impulse response of a transmission line distortion disclosed in Patent Document 1. In FIG. 20, a0 and a1 are precursor and center components estimated by Viterbi algorithm, respectively, and a2 and a3 are post cursor components which are removed by using a signal estimated by a0 and a1. When binary data {1, −1} is transmitted via a transmission line of a type that has an impulse response formed of one precursor ISI tap, a main tap, and a plurality of postcursor ISI taps, the received data is greatly disturbed by the ISI. For this received data, when maximum likelihood sequence estimation is performed using a Viterbi algorithm, processing of a trellis diagram with a number of states of 2 (number of precursor ISI taps+postcursor ISI tap number) is necessary.

FIG. 21 is a diagram showing the configuration of the conventional delayed decision feedback sequence estimator disclosed in Patent Document 1. FIG. 22 is a state transition diagram in the Viterbi algorithm disclosed in Patent Document 1. The effect of the postcursor ISI is removed from received data which is disturbed by ISI, by first and second DFEs 213 and 214. The number of states of the Viterbi algorithm, as shown in the trellis diagrams in FIG. 22, is reduced to 2, and the maximum likelihood sequence estimation is efficiently performed based on this reduced trellis diagram.

The reason that 2 DFEs 213 and 214 are necessary in FIG. 21 is that the number of states of the trellis after reduction is 2, and a DFE is necessary for each state. Output of a first provisional decision unit 220 of FIG. 21 is supplied to the first DFE 213, and is used in processing received data at a subsequent point in time.

In Patent Document 1, as shown in FIG. 21, the first DFE 213, a subtractor 24, a squaring calculator 25, an adder 26, a first compare-select circuit 29, and a first provisional decision unit 211 form a feedback loop, and determine an upper bound of processing speed. Therefore, in Patent Document 1, by performing tap calculation in advance for the DFE corresponding to a first postcursor ISI tap, processing time for the feedback loop is shortened. FIG. 23 is a diagram shown disclosed in Patent Document 1. The feedback loop is configured from a first selector 118, a subtractor 15, a squaring calculator 16, an adder 17a, and a first compare-select circuit 121. Shortening of the feedback loop of FIG. 23 is achieved as compared with the feedback loop of FIG. 21.

One of pipelined DFE computation is disclosed in Non-Patent Document 2 (Erich F. Haratesh, "New architectures for reduced-state sequence detection with local feedback", International Symposium on VLSI Design, Automation and Test).

[Patent Document 1] JP Patent Kokai Publication No. JP-A-10-22879

[Non-Patent Document 1] Alexandra Duel-Hallen and Chris Heegard, "Delayed Decision-Feedback Sequence Estimation", IEEE Transactions on Communications, 1989

[Non-Patent Document 2] Erich F. Haratesh, "New architectures for reduced-state sequence detection with local feedback", International Symposium on VLSI Design, Automation and Test

SUMMARY OF THE DISCLOSURE

The entire disclosure of Patent Document 1 is incorporated herein by reference thereto. The following analysis is given by the present invention.

In the delayed decision feedback sequence estimator shown in FIG. 23, a feedback loop is made up of a first selector 118, a subtractor 15, a squaring calculator 16, an adder 17a, and a first compare-select circuit 121 so that, if a period of the received data is shorter than processing time of the feedback loop, it is not possible to correctly perform processing.

According to the present invention, there is provided a delayed decision feedback sequence estimator adapted to divide received data symbol sequence into a plurality of blocks, each including (L+M) symbols. The estimator comprises (L+M) DDFSE computing units, each operating at a clock rate which is 1/M of the rate of received data, to realize parallel processing using (L+M) DDFSE computing units. The estimator further comprises an edge effect detection-correction circuit for preventing deterioration of error rate due to the delayed decision feedback sequence estimation processing of the received data symbol sequence divided into a plurality of blocks, thereby improving overall processing throughput.

In one mode of the present invention, there is provided a DDFSE computing unit group of (L+M) items that are connected in a pipeline configuration and that perform parallel processing of received data symbols separated into blocks of a predetermined length (L+M), and an edge effect detection-correction circuit which utilizes overlapping between the neighboring blocks to detect and correct deterioration in bit error rate occurring at a block end. If the processing speed of the respective DDFSE computing units is assumed to be f[Hz], the delayed decision feedback sequence estimator according to the present invention can perform processing of received data up to a speed equivalent to f*M[Symbol/s].

The meritorious effects of the present invention are summarized as follows.

According to the present invention, the received data is divided into a plurality of blocks, each made up of (L+M) symbols, and there are provided (L+M) DDFSE computing units, each operating at a clock rate which is 1/M of the rate of received data, to realize parallel processing thereamong and means for preventing deterioration of error rate due to separated processing of the received data which is divided into a plurality of blocks, thereby making it possible to raise processing speed irrespective of processing speed of each of the DDFSE computing units. As a result, in comparison to the conventional technology in which an upper bound of processing speed is limited by a feedback loop, it is possible to significantly improve processing speed.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

PREFERRED MODES OF THE INVENTION

Preferred modes according to the present invention will be described with reference to the drawings.

Figure 1:
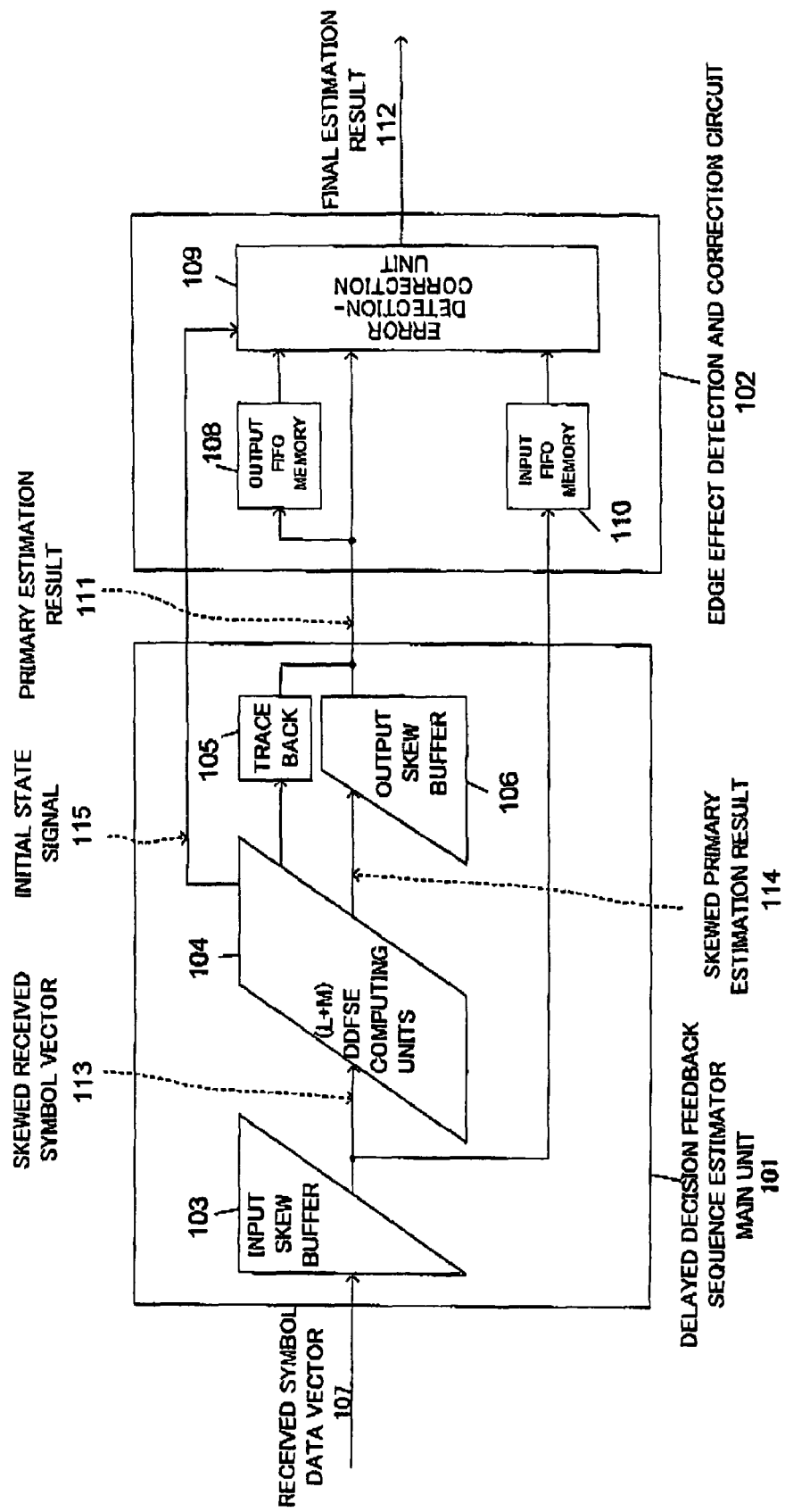
FIG. 1 is a block diagram of a first example of a delayed decision feedback sequence estimator according to the present invention.

FIG. 1 is a block diagram illustrating the configuration of a delayed decision feedback sequence estimator according to a first example of the present invention. This delayed decision feedback sequence estimator comprises a delayed decision feedback sequence estimator main unit 101 which performs delayed decision feedback sequence estimation processing of received symbol data 107, to output a primary estimation result 111, and an edge effect detection and correction circuit 102 which corrects deterioration (hereinafter referred to as "edge effect") in error rate of the primary estimation result 111 and outputs a final estimation result 112. The edge effect occurs due to separated processing of the received symbol data sequence which is divided into a plurality of blocks.

A delayed decision feedback sequence estimator main unit 101 comprises an input skew buffer 103, a DDFSE computing unit group 104 which includes (L+M) DDFSE computing units pipeline-connected, a trace-back block 105, and an output skew buffer 106. The input skew buffer 103 receives serial-to-parallel converted received data symbol vector 107 of length L, and generates and outputs a skewed received symbol vector 113 with a delay added to each of the received data symbols in accordance with relative position of the received data symbol in the received data symbol vector 107. The DDFSE computing unit group 104 receives the skewed received symbol vector 113 as an input and performs computation of delayed decision feedback sequence estimation. The trace-back block 105 receives outputs of the DDFSE computing unit group 104. The output skew buffer 106 receives a skewed primary estimation result 114 supplied from the DDFSE computing unit group 104, and adds to each items of data a delay in accordance with relative position of the data in the vector. An output of the trace-back block 105 and an output of the output skew buffer 106 are combined to generate a primary estimation result 111.

An edge effect detection and correction circuit 102 comprises an output FIFO memory 108, an error detection-correction unit 109, and an input FIFO memory 110. The output FIFO memory 108 receives and holds the primary estimation result 111 output from the delayed decision feedback sequence estimator main unit 101, for a certain period of time. The error detection-correction unit 109 receives the primary estimation result 111, an output of the output FIFO memory 108, an output of an input FIFO memory 110, and an initial state signal 115, and checks whether the primary estimation 111 contains a bit error caused by an edge effect, and if a bit error is detected, performs correction of the bit error. The input FIFO memory 110 holds the skewed received symbol vector 113 output from the input skew butter 103, for a certain period of time. A final delayed decision feedback sequence estimation result 112 of the received data symbol is output from the error detection-correction unit 109.

Figure 2:
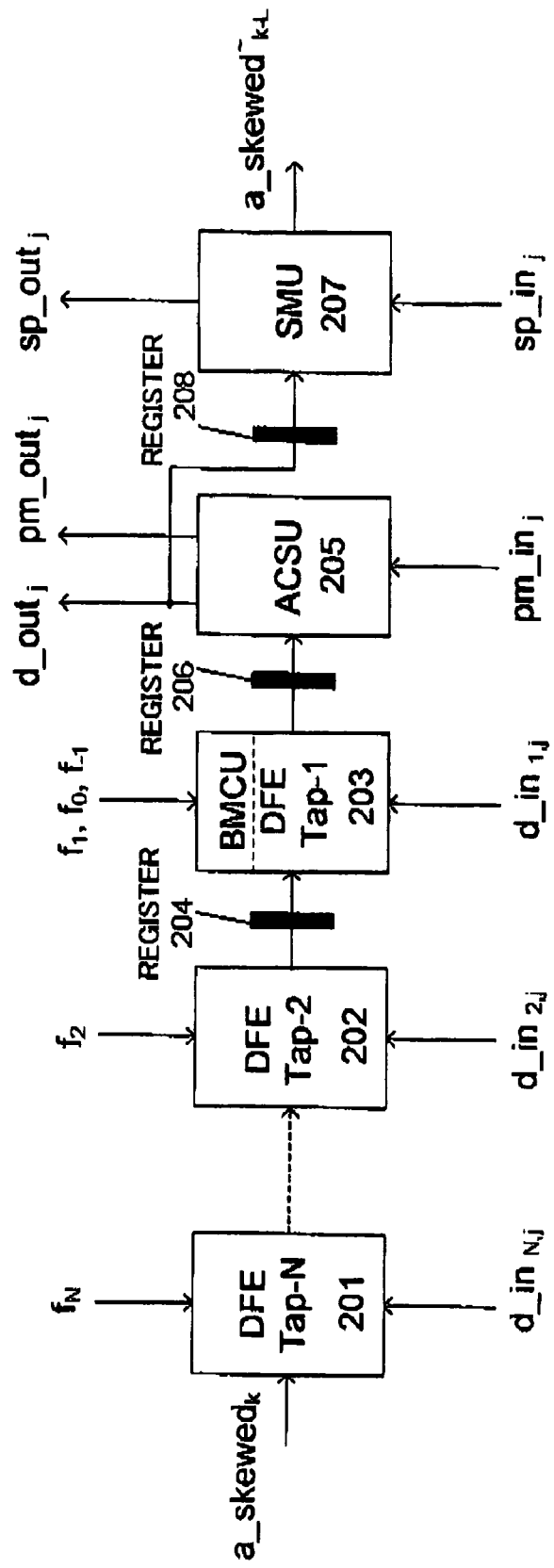
FIG. 2 is a block diagram of a DDFSE computing unit.

Each of (L+M) DDFSE computing units that make up the DDFSE computing unit group 104, as shown in FIG. 2, comprises a Decision Feedback Equalizer (hereinafter referred to as DFE), a Branch Metrics Computation Unit 203 (hereinafter referred to as BMCU), an Add-Compare-Select Unit 205 (hereinafter referred to as ACSU), and a Survivor Path Memory Unit 207 (hereinafter referred to as SMU). The DFE receives a skewed received symbol data a_skewed$_k$ as one input, and ACS decision signals, that is, from an ACS decision signal of one symbol before, to an ACS decision signal of N symbols before, as other inputs d_in$_{1,j}$ to d_in$_{N,j}$ respectively and is supplied with weightings of tap-1 (203) to tap-N (201) respectively represented as $f_1$ to $f_N$. The BMCU 203 receives an output of the N-tap DFE as input. The ACSU 205 receives the branch metrics output from the BMCU 203 as one input, and a path metric output of a previous stage DDFSE computing unit as another input pm_in$_j$, and outputs an updated path metric pm_out$_j$ and a decision signal d_out$_j$. The SMUt 207 receives a decision signal d_out$_j$ of the ACSU 205 as one input, and a survivor path memory output of a previous stage DDFSE computing unit as another input sp_in$_j$, and outputs an updated survivor path memory sp_out$_j$. One skewed primary estimation result a_skewed$\tilde{}_{k-L}$ is output from the SMU 207. Weightings $f_0$ and $f_{-1}$ are supplied to BMCU 203. A register 204 is provided between tap-1 (203) and tap-2 (202) and there is provided a register (not shown) between other neighboring taps. Registers 206 and 208 are provided between BMCU 203 and ACSU 205 and between ASCU 205 and SMU 207, respectively to enable pipe-line operation.

Figure 3:
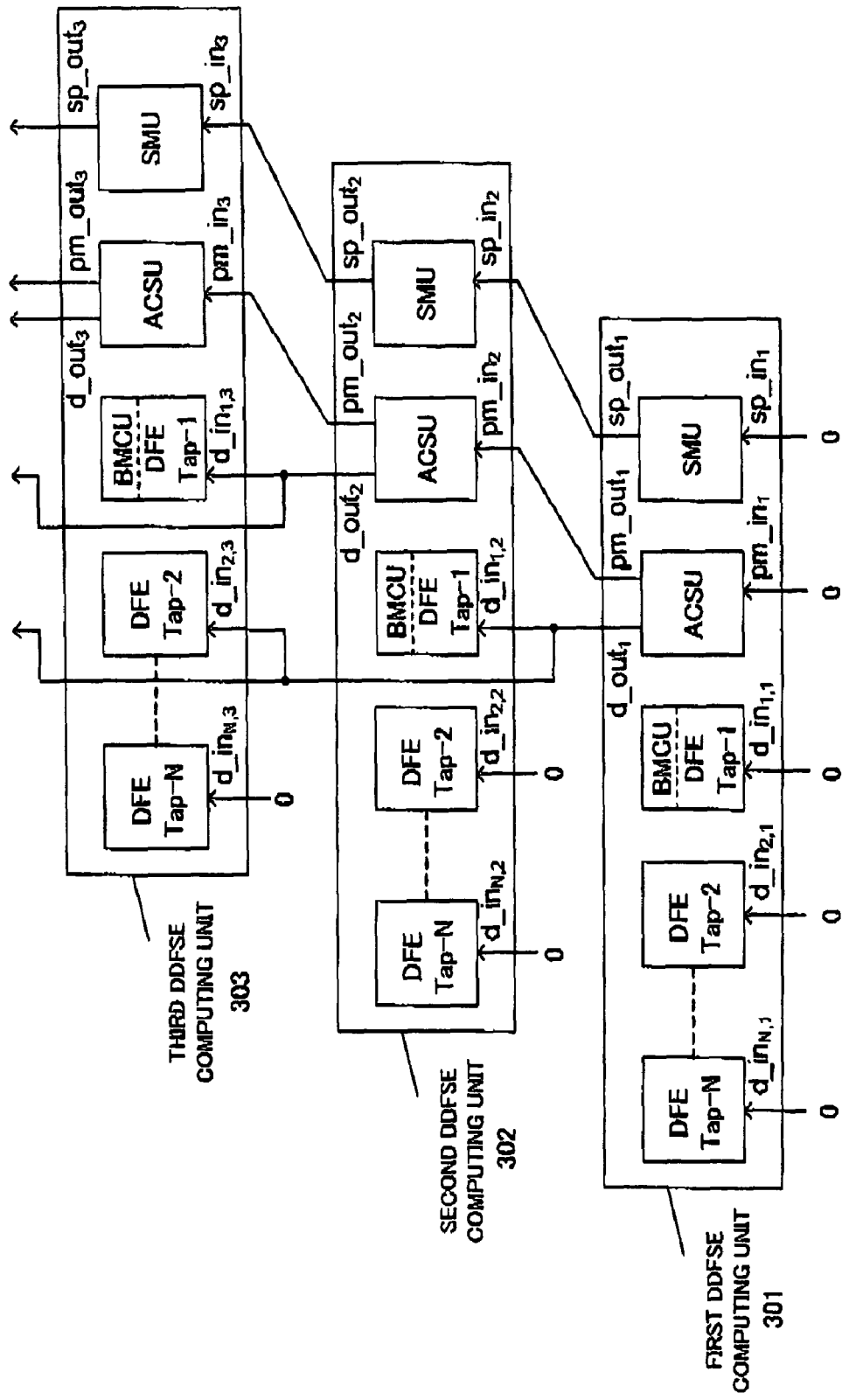
FIG. 3 is a view illustrating connections of a DDFSE computing unit group.

In the DDFSE computing unit group 104, (L+M) DDFSE computing units are connected in a pipeline configuration, as shown in FIG. 3. In FIG. 3, although no limitation is imposed on the present invention, there are provided 3 DDFSE computing units connected in a pipeline configuration. An input pm_in$_1$ of the path metric of a first DDFSE computing unit 301 is fixed at zero, an input pm_in$_2$ of the path metric of a second DDFSE computing unit 302 is connected to an output pm_out$_1$ of the path metric of the first DDFSE computing unit 301, and sequentially, an input pm_in$_{L+M}$ of the path metric of an (L+M)-th DDFSE computing unit is connected to an output pm_out$_{L+M-1}$ of the path metric of the (L+M-1)-th DDFSE computing unit. Furthermore, an input sp_in$_1$ of a survivor path memory of the first DDFSE computing unit 301 is fixed at zero, an input sp_in$_2$ of the survivor path memory SMU of the second DDFSE computing unit 302 is connected to an output sp_out$_1$ of the SMU of the first DDFSE computing unit 301, and sequentially, an input sp_in$_{L+M}$ of the survivor path memory SMU of an (L+M)-th DDFSE computing unit is connected to an output sp_out$_{L+M-1}$ of the survivor path memory unit SMU of the (L+M-1)-th DDFSE computing unit.

In addition, in case the number of taps of a DFE is N, data input d_in$_{1,1}$ to tap 1 of a DFE of the first DDFSE computing unit 301 is fixed at zero, decision output d_out$_1$ of the first DDFSE computing unit 301 is connected to data input d_in$_{1,2}$ to tap 1 of the second DDFSE computing unit 302, and sequentially, decision output d_out$_{L+M-1}$ of the (L+M-1)-th DDFSE computing unit is connected to data input d_in$_{1,L+M}$ to tap 1 of the (L+M)-th DDFSE computing unit.

Furthermore, data input d_in$_{2,1}$ to tap 2 of a DFE of the first DDFSE computing unit 301, and data input d_in$_{2,2}$ to tap 2 of a DFE of the second DDFSE computing unit 302 are fixed at zero, decision output d_out$_1$ of the first DDFSE computing unit 301 is connected to data input d_in$_{2,3}$ to tap 2 of a third DDFSE computing unit 303, and sequentially, decision output d_out$_{L+M-2}$ of the (L+M-2)-th DDFSE computing unit is connected to data input d_in$_{2,L+M}$ to tap 2 of the DFE of the (L+M)-th DDFSE computing unit. In the same way, data input d_in$_{N,1}$ to tap N of the first DDFSE computing unit 301, to data input d_in$_{N,N}$ to tap N of a DFE of the N-th DDFSE computing unit, are fixed at zero, decision output d_out$_1$ of the first DDFSE computing unit 301 is connected to data input d_in$_{N,N+1}$ to tap N of a DFE of an (N+1)-th DDFSE computing unit, and sequentially, decision output d_out$_{L+M-N}$ of the (L+M-N)-th DDFSE computing unit is connected to data input d_in$_{N,L+M}$ to tap N of a DFE of the (L+M)-th DDFSE computing unit.

Figure 4:
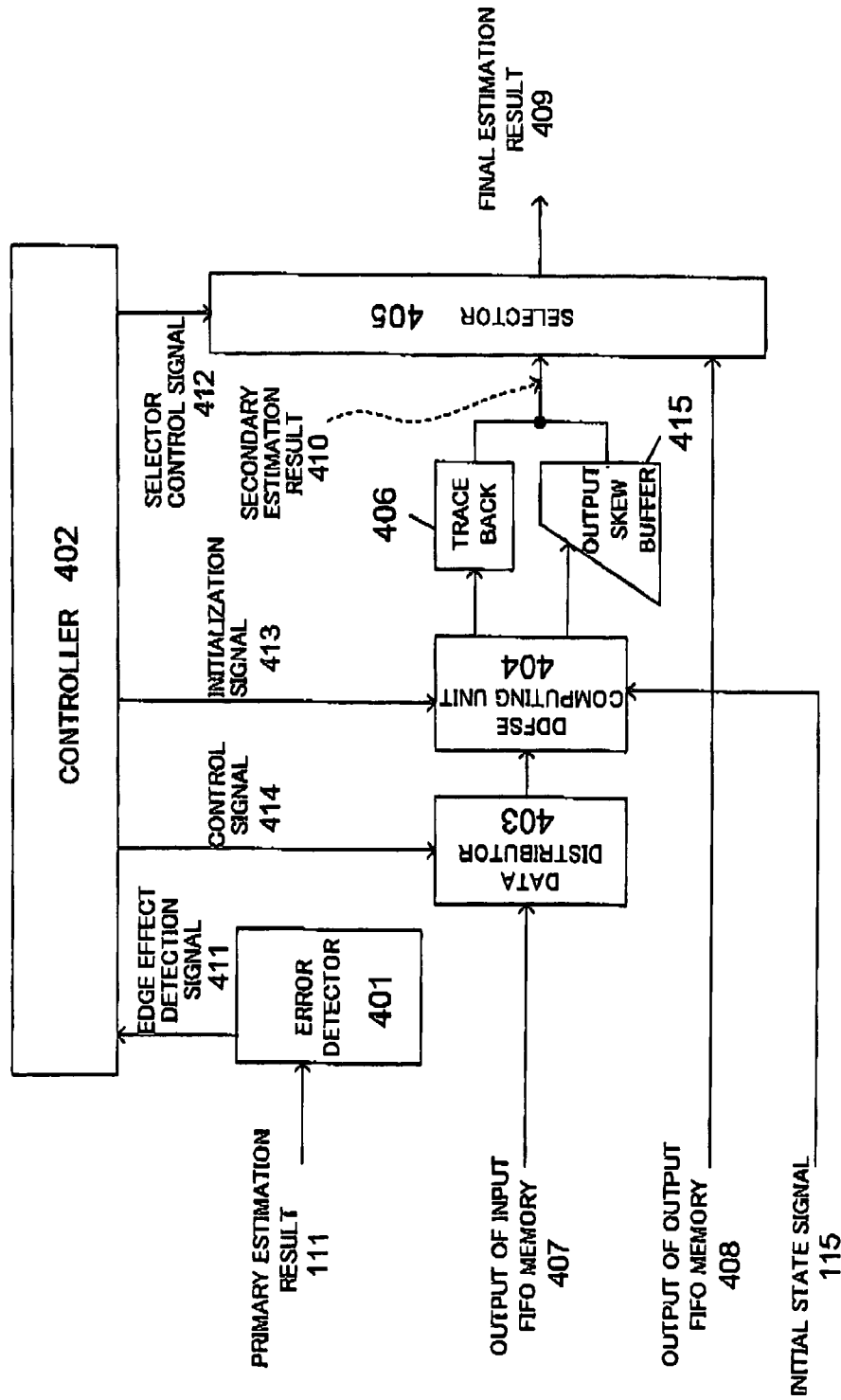
FIG. 4 is a block diagram of an error detection-correction unit.

As shown in FIG. 4, the error detection-correction unit 109 comprises an error detector 401, a controller 402, a data distributor 403, a DDFSE computing unit 404, a selector 405, a trace-back block 406 and an output skew buffer 415.

The error detector 401 receives the primary estimation result 111, and checks if an edge effect is occurring in the primary estimation result 111. The error detector 401, if an edge effect is detected, outputs an edge effect detection signal 411 to a controller 402.

The controller 402 receives the edge effect detection signal 411 as input, and controls a data distributor 403, a DDFSE computing unit 404, and a selector 405. The data distributor 403 receives a control signal 414 from the controller 402 as one input and a received data symbol vector 407 held in the input FIFO memory 110 as another input.

The DDFSE computing unit 404 receives a received data symbol supplied from the data distributor 403 as one input, and an initialization signal 413 and an initialization state signal 115 from the controller 402 as other inputs.

The trace-back block 406 and an output skew buffer 415 receive an estimation result output from the DDFSE computing unit 404 as input. The selector 405 receives a secondary estimation result 410 from the output skew buffer 415 and the trace-back block 406, as one data input and an output 408 of the output FIFO memory 108 as another data input and also receives a selector control signal 412 for switching data to be outputted, from the controller 402.

Figure 5:
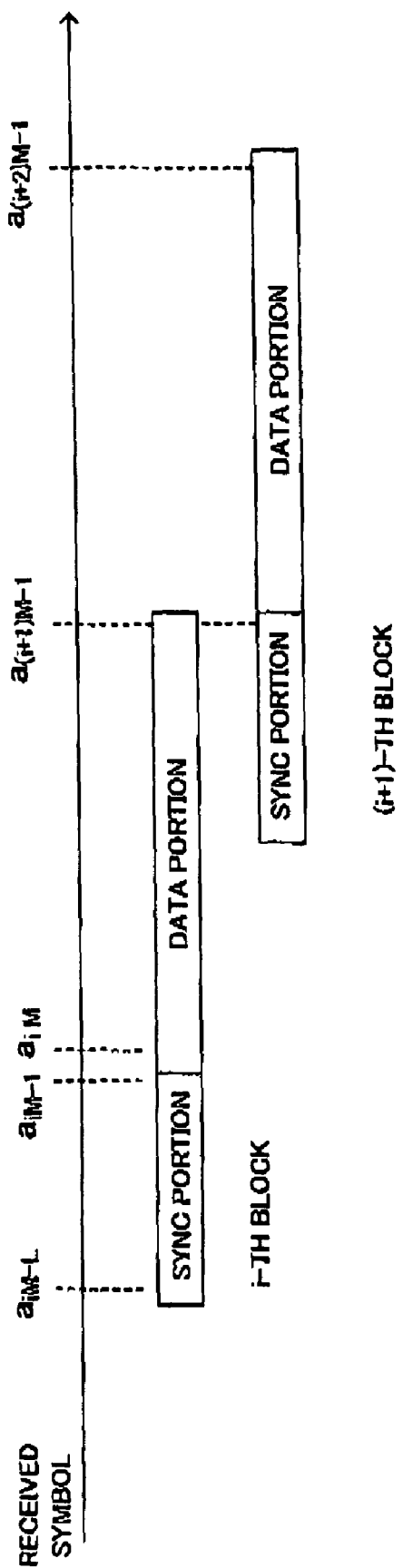
FIG. 5 is a view showing block division of a received symbol data sequence.

The operation of the delayed decision feedback sequence estimator configured of the first example will now be described. As shown in FIG. 5, a received data symbol sequence is divided into blocks, each being formed of predetermined length L+M of received data symbols and having an overlap of a predetermined length L (where L and M are positive integers greater than or equal to 1, and M is greater than L). L symbols from the beginning of each block are hereinafter referred to as "sync portion", and the remaining M symbols are hereinafter referred to as "data portion". We use a notation in which $a_k$ refers to a received symbol quantized and sampled at time t=kT (where T is one period) by a receiver. The received symbols [a$_{iM-L}$, ..., a$_{(i+1)M-1}$] are included in an i-th block, with [a$_{iM-L}$, ..., a$_{iM-1}$] forming a sync portion, and [a$_{iM}$, ..., a$_{(i+1)M-1}$] forming a data portion.

Figure 6:
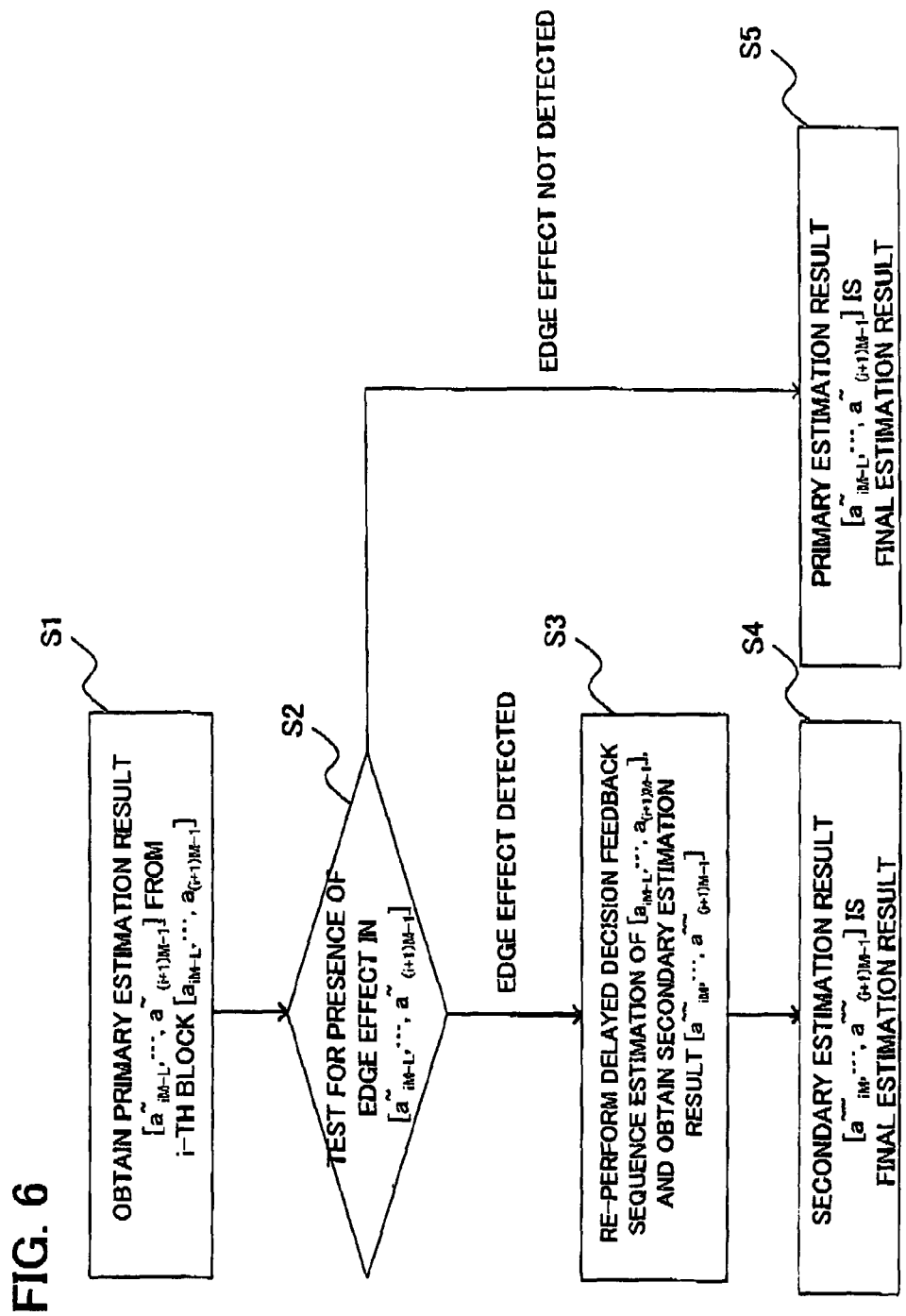
FIG. 6 is a flowchart illustrating a procedure of delayed decision feedback sequence estimation.

Delayed decision feedback sequence estimation is carried out independently for each block. FIG. 6 is a flowchart illustrating overall processing of received symbols included in an i-th block of interest. First, the delayed decision feedback sequence estimation is carried out on a block of the predetermined length L+M formed of the received symbols [a$_{iM-L}$, ..., a$_{(i+1)M-1}$], and a primary estimation result [a$\tilde{}_{iM-L}$, ..., a$\tilde{}_{(i+1)M-1}$] is generated (step S1 in FIG. 6). This processing is implemented by the delayed decision feedback sequence estimator main unit 101 of FIG. 1.

Next, check is performed where a bit error (edge effect) in the primary estimation result due to dividing received data into blocks to perform processing in the primary estimation result [a$\tilde{}_{iM-L}$, ..., a$\tilde{}_{(i+1)M-1}$] is present or not (step S2 in FIG. 6). If an edge effect is detected, a sequence estimation for the relevant block is carried out once again to generate the secondary estimation result [a$\tilde{\ }_{iM}$, ..., a$\tilde{\ }_{(i+1)M-1}$] (step S3 in FIG. 6). If an edge effect is detected, M items of data of [a$\tilde{\ }_{iM}$, ..., a$\tilde{\ }_{(i+1)M-1}$], which is the secondary estimation result, become a final estimation result of the relevant block (step S4 in FIG. 6).

Contrary to this, if an edge effect is not detected in step S2, M items of data of [a$\tilde{\ }_{iM-L}$, ..., a$\tilde{\ }_{(i+1)M-1}$], which is the primary estimation result, become the final estimation result of the relevant block (step S5 in FIG. 6). This processing is implemented according to the edge effect detection and correction circuit 102 of FIG. 1.

The operation of performing delayed decision feedback sequence estimation on an i-th block [$a_{iM-L}$, ..., $a_{(i+1)M-1}$] of an interest up to obtaining a primary estimation result [a$\tilde{\ }_{iM-L}$, ..., a$\tilde{\ }_{(i+1)M-1}$] will now be described in detail.

Figure 7:
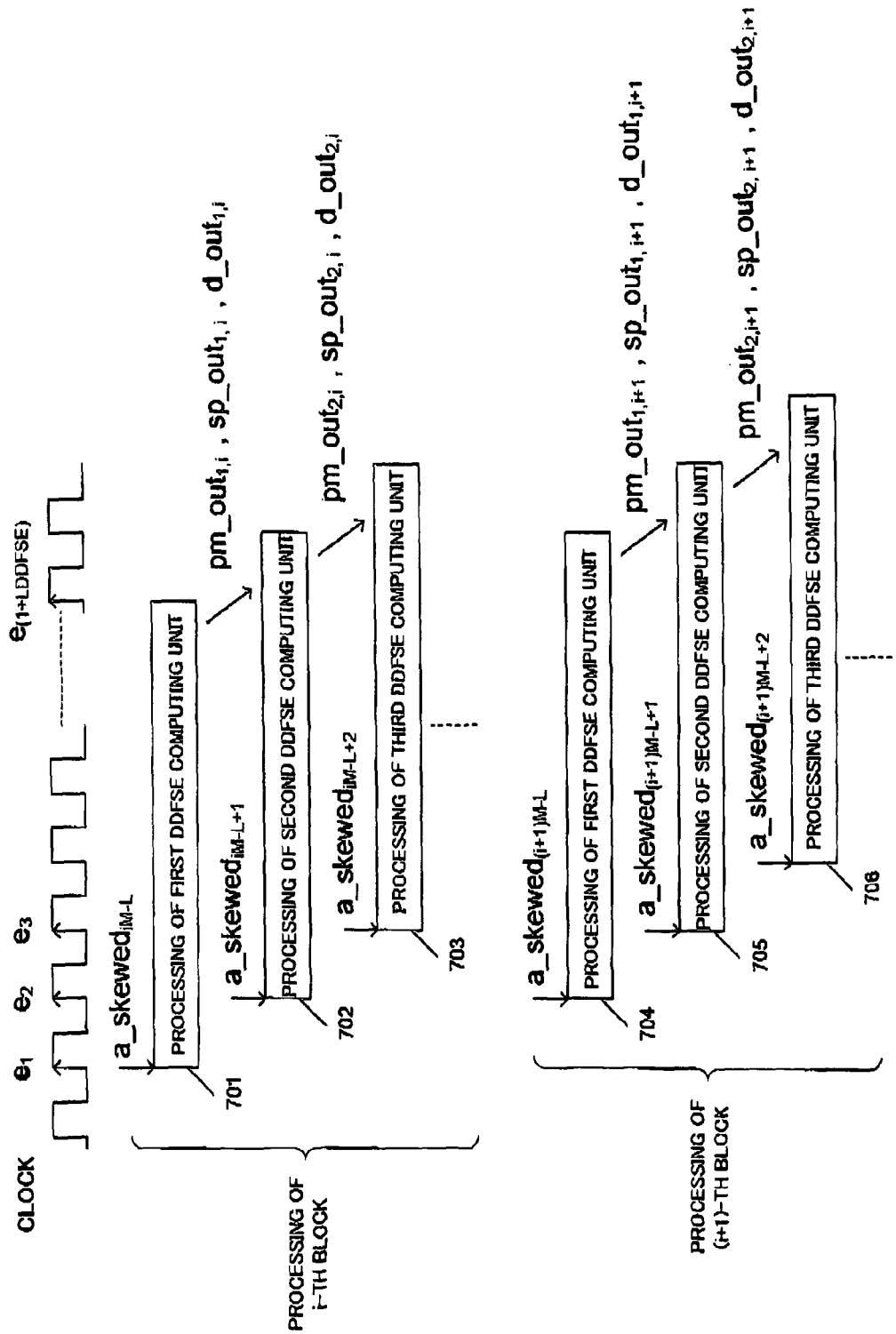
FIG. 7 is a timing chart of delayed decision feedback sequence estimation.

(L+M) received symbols [$a_{iM-L}$, ..., $a_{(i+1)M-1}$] are sequentially processed using (L+M) pipeline-connected DDFSE computing units as shown in FIG. 3. FIG. 7 shows a timing chart of this sequential processing. The first DDFSE computing unit 301 receives a first symbol a_skewed$_{iM-L}$ of a first block from an input skew buffer 103 at a first clock edge ($e_1$), to start DDFSE computation, and sends an updated path metric pm_out$_{1,i}$, an updated survivor path memory sp_out$_{1,i}$, (output of SMU is referred to as survivor path memory) and a decision result d_out$_{1,i}$ to a second DDFSE computing unit 302. This processing is represented by 701 in FIG. 7.

The second DDFSE computing unit 302 in FIG. 3 receives a second symbol a_skewed$_{iM-L+1}$ of an i-th block from the input skew buffer 103 at a second clock edge ($e_2$), receives a path metric pm_out$_{1,i}$, a survivor path memory sp_out$_{1,i}$, and a decision result d_out$_{1,i}$, from the first DDFSE computing unit, to start DDFSE computation, and sends an updated path metric pm_out$_{2,i}$, an updated survivor path memory sp_out$_{2,i}$, and a decision result d_out$_{2,i}$ to a third DDFSE computing unit 303. This processing is represented by 702 in FIG. 7. Sequentially, the (L+M)-th DDFSE computing unit receives an (L+M)-th symbol a_skewed$_{(i+1)M-1}$ of an i-th block from an input skew buffer at an (L+M)-th clock edge ($e_{L+M}$), receives a path metric pm_out$_{L+M-1,i}$, a survivor path memory sp_out$_{L+M-1,i}$ and a decision result d_out$_{L+M-1,i}$ from the an (L+M-1)-th DDFSE computing unit, to start DDFSE computation.

There is a latency $L_{DDFSE}$ from starting to finishing processing of symbols in a DDFSE computing unit. However, in the present example, the DDFSE computing units are connected in a pipeline configuration with registers 204, 206, and 208 as shown in FIG. 2 and hence it is possible to start processing of a new symbol at each clock cycle. Therefore, the first DDFSE computing unit 301 in FIG. 3, receives a first symbol a_skewed$_{(i+1)M-L}$ of an (i+1)-th block from an input skew buffer at a second clock edge ($e_2$), starts DDFSE computation and sends an updated path metric pm_out$_{1,i+1}$, an updated survivor path memory sp_out$_{1,i+1}$, and a decision result d_out$_{1,i+1}$, to the second DDFSE computing 302, as shown in FIG. 7. This processing is represented by 704.

The second DDFSE computing unit 302 receives a third symbol a_skewed$_{(i+1)M-L+1}$ of an (i+1)-th block from an input skew buffer at a third clock edge ($e_3$), receives a path metric pm_out$_{1,i+1}$, a survivor path memory sp_out$_{1,i+1}$, and a decision result d_out$_{1,i+1}$ from the first DDFSE computing unit, starts computation of the DDFSE, and sends an updated path metric pm_out$_{2,i+1}$, an updated survivor path memory sp_out$_{2,i+1}$, and a decision result d_out$_{2,i+1}$, to the third DDFSE computing 303. This processing is represented by 705. Sequentially, the (L+M)-th DDFSE computing unit receives an (L+M)-th symbol a_skewed$_{(i+2)M-1}$ of an (i+1)-th block from an input skew buffer at an (L+M+1)-th clock edge ($e_{L+M+1}$), receives a path metric pm_out$_{L+M-1,i+1}$, a survivor path memory sp_out$_{L+M-1,i+1}$, and a decision result d_out$_{L+M-1,i+1}$ from the an (L+M-1)-th DDFSE computing unit, to start DDFSE computation.

Figure 8:
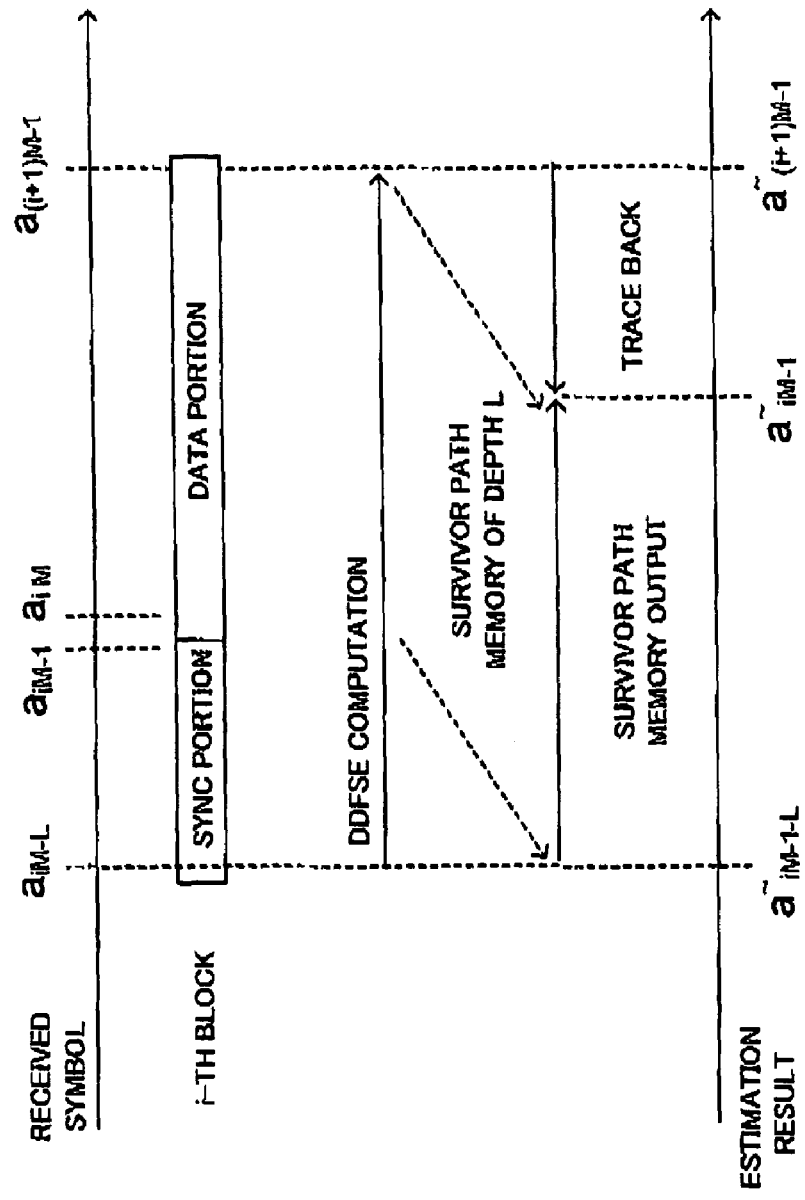
FIG. 8 is a diagram illustrating trace back.

If depth of survivor path memory unit SMU is L, as shown in FIG. 8, an L-step track-back is performed to decide an estimation result and as a result of processing of a received symbol $a_k$ at a time point t=kT by the DDFSE computing unit, a skewed primary estimation result a_skewed$\tilde{\ }_{k-L}$ before an L-cycle thereof, is output from the survivor path memory unit SMU. Therefore, a skewed primary estimation result a_skewed$\tilde{\ }_{iM-L}$ is output from the (L+1)-th DDFSE computing unit, and is supplied to a first input of an output skew buffer 106; a_skewed$\tilde{\ }_{iM-L+1}$ which is a skewed primary estimation result is output from the (L+2)-th DDFSE computing unit, and is supplied to a second input of the output skew buffer 106; a skewed primary estimation result a_skewed$\tilde{\ }_{(i+1)M-L-1}$ is output sequentially from the (L+M)-th DDFSE computing unit, and is supplied to an Mth input of the output skew buffer 106.

The processing in the DDFSE computing unit shown in FIG. 2 will now be described. As shown specifically in FIG. 13, an impulse response of a transmission line is represented by $\{f_{-1}, f_0, f_1, f_2, ..., f_N\}$. Here, $f_{-1}$ is a precursor ISI tap, $f_0$ is a main tap, and $f_1$ to $f_N$ are postcursor ISI taps. A DFE with N taps is provided for each state of a trellis diagram after reduction. If ISI $f_1$ to $f_N$ are removed, a remaining impulse-response is $\{f_{-1}, f_0\}$, and a received data sequence can be represented by a trellis diagram, in which the number of states has been reduced to 2. In two N-tap DFEs, each being constituted by 201, 202, and 203 of FIG. 2, ISI due to $f_1$ to $f_N$ which are postcursor ISI taps, is removed from a received data symbol $a_k$. Furthermore, BMCU 203, ACSU 204, and SMU 205 perform Viterbi algorithm processing based on the trellis diagram in which the number of reduced states is 2, and estimate maximum likelihood sequence. The processing of BMCU 203, ACSU 205, SMU 207, and two N-tap DFEs will be described in detail.

An ACSU 205 of a j-th DDFSE computing unit uses a path metric:

pm_in$_j$={pm_in$_j$(0), pm_in$_j$(1)}, supplied from an ACSU of a (j−1)-th DDFSE computing unit, and branch metrics:

bm$_j$(0, 0), bm$_j$(0,1), bm$_j$(1, 0), and bm$_j$(1,1), supplied from a BMCU 204, and outputs an updated path metric:

pm_out$_j$={pm_out$_j$(0), pm_out$_j$(1)} and a decision signal:
d_out$_j$={d_out$_j$(0), d_out$_j$(1)}, based on the following Equation (I).

Equation (I): updating of path metric and decision signal:

$$pm\_out_j(0)=\min\{pm\_in_j(0)+bm_j(0,0), pm\_in_j(1)+bm_j(0,1)\}$$

$$pm\_out_j(1)=\min\{pm\_in_j(0)+bm_j(1,0), pm\_in_j(1)+bm_j(1,1)\}$$

$$d\_out_j(0)=(pm\_in_j(0)+bm_j(0,0))>(pm\_in_j(1)+bm_j(0,1))$$

$$d\_out_j(1)=(pm\_in_j(0)+bm_j(1,0))>(pm\_in_j(1)+bm_j(1,1))$$

where
pm_in$_j$(a) represents a path metric input of state a,
pm_out$_j$(a) represents a path metric output of state a,
bm$_j$(a, b) represents a branch metric of a branch transitioning from state b to state a,
d_out$_j$(a) represents a decision signal of state a, min (x,y) indicates an operator which finds and outputs a minimum element out of x and y, and (x>y) indicates an comparison of x and y and assumes 1 if x>y and assumes 0 if x<=y.

The BMCU 204 of the j-th DDFSE computing unit receives outputs of N-tap DFEs dfe_out$_j$(1, 0), dfe_out$_j$(1,1), generates branch metrics bm$_j$(0, 0), bm$_j$(0,1), bm$_j$(1, 0), bm$_j$(1,1) based on the following Equation (II). It is to be noted that dfe_out$_j$(1,a) represents output of an N-tap DFE of state a. Equation (II): updating of branch metrics.

$$bm_j(0,0)=\{dfe\_out_j(1, 0)-(-f_0-f_{-1})\}^2$$

$$bm_j(1,0)=\{dfe\_out_j(1, 0)-(-f_0+f_{-1})\}^2$$

$$bm_j(0,1)=\{dfe\_out_j(1, 1)-(f_0-f_{-1})\}^2$$

$$bm_j(1,1)=\{dfe\_out_j(1, 1)-(f_0+f_{-1})\}^2$$

The SMU 207 of the j-th DDFSE computing unit uses a survivor path memory of depth L supplied from the SMU of the (j−1)-th DDFSE computing unit:

sp_in$_j$={(sp_in$_j$(1,0), sp_in$_j$(2,0), ..., sp_in$_j$(L,0)), (sp_in$_j$(1,1), sp_in$_j$(2,1), ..., sp_in$_j$(L,1))}, and a decision signal d_out$_j$ supplied from the ACSU 205, and outputs an updated survivor path memory:

sp_out$_j$={(sp_out$_j$(1,0), sp_out$_j$(2,0), ..., sp_out$_j$(L,0)), (sp_out$_j$(1,1), sp_out$_j$(2,1), ..., sp_out$_j$(L,1))} based on the following Equation (III).

Equation (III): updating of survivor path memory:

$$sp\_out_j(m, 0)=sp\_in_j(m-1, d\_out_j(0))$$

$$sp\_out_j(m, 1)=sp\_in_j(m-1, d\_out_j(1))$$

$$sp\_out_j(1, 0)=d\text{out}_k(0)$$

$$sp\_out_j(1, 1)=d\text{out}_k(1)$$

where sp_in$_j$(b,a) represents input to a memory element of depth b of a survivor path of state, sp_out$_j$(b,a) represents output of a memory element of depth b of a survivor path of state a, d_out$_j$ represents a decision signal of state a, and m is a positive integer of 2 to L The SMU 207 of the j-th DDFSE computing unit uses pm_out$_j$, and sp_in$_j$(L, 0) and sp_in$_j$(L, 1) to output a skewed primary estimation result a_skewed$^\sim_{k-L}$ based on the following Equation (IV).

Equation (IV): updating of primary estimation result:

$$a\_skewed^\sim_{k-L}=sp\_in_j(L, (pm\_out_j(1)<pm\_out_j(0)))$$

The N-tap DFE of the j-th DDFSE computing unit including tap-1 to tap-N, uses skewed received symbol data a_skewed$_k$, and d_in$_{1,j}$ to d_in$_{N,j}$ that are decision signal inputs from the (j−1)-th to the (j−N)-th DDFSE computing units, to compute output dfe_out$_j$(1, 0) and dfe_out$_j$(1,1) of the N-tap DFE based on the following Equation (IV). This DFE computation is pipelined.

Equation (V): updating of output of N-tap DFE:

$$dfe\_out_j(n, 0)=dfe\_out_j(n+1, d\_in_{n,j}(0))+f_n$$

$$dfe\_out_j(n, 1)=dfe\_out_j(n+1, d\_in_{n,j}(1))-f_n$$

$$dfe\_out_j(N, 0)=a_k+f_N$$

$$dfe\_out_j(N, 1)=a_k-f_N$$

where dfe_out$_j$(b, a) represents a value at which computation from N-tap to b-tap, among N-tap DFEs of state a, is completed, and n is a positive integer from N−1 to 1.

The input skew buffer 103 in FIG. 1 receives a received data symbol vector of a predetermined length M, and generates L overlaps between blocks, in addition to supplying the received data symbols to each DDFSE computing unit, with a latency matching a latency at which each DDFSE computing unit that performs sequential processing starts processing.

The input skew buffer 103 adds A-cycle latency (A is a positive integer) to a first input symbol $a_{iM-L}$ to output a_skewed$_{iM-L}$ as first output, adds (A+1)-cycle latency to a second input symbol $a_{iM-L+1}$, to output a_skewed$_{iM-L+1}$ as second output, and sequentially, adds (A+M−1)-cycle latency to an M-th input symbol $a_{(i+1)M-L-1}$, to output a_skewed$_{(i+1)M-L-1}$ as M-th output. The input skew buffer 103 further adds (M−1)-cycle latency to the first output a_skewed$_{iM-L}$, to output a_skewed$_{(i+1)M-L}$ as (M+1)-th output, adds (M−1)-cycle latency to the second output a_skewed$_{iM-L+1}$, to output a_skewed$_{(i+1)M-L+1}$ as (M+2)-th output, and sequentially, adds (M−1)-cycle latency to the L-th output a_skewed$_{iM-1}$, to output a_skewed$_{(i+1)M-1}$ as (L+M)-th output.

Figure 9:
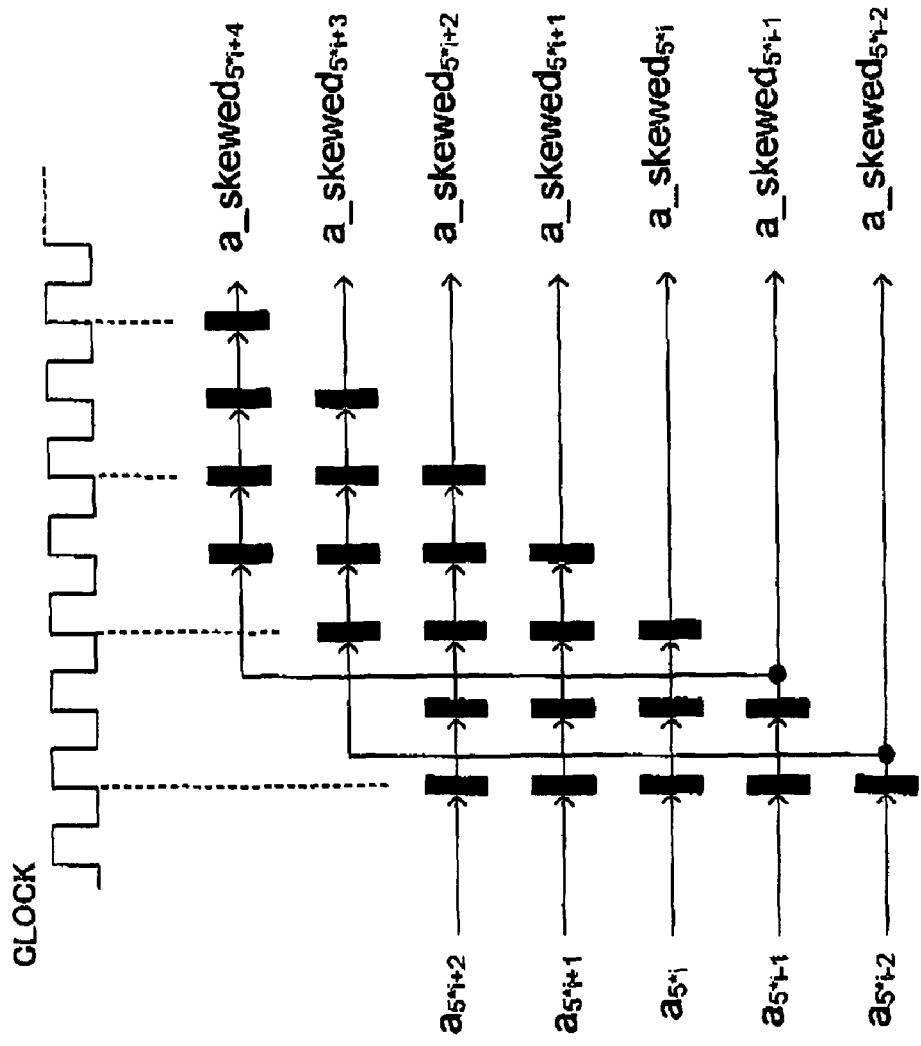
FIG. 9 is a view illustrating an example of an input skew buffer.

FIG. 9 shows a specific example of an input skew buffer with M=5, L=2, and A=1. The input skew buffer 103 adds 1-cycle latency to a first input symbol $a_{5\times i-2}$ to output a_skewed$_{5\times i-2}$ as first output. In FIG. 9, a register represented by a black rectangle between $a_{5\times i-2}$ and a_skewed$_{5\times i-2}$ produces 1-clock cycle latency. The input skew buffer 103 adds (A+1)=(1+1)-cycle latency to a second input symbol $a_{5\times i-1}$, to output a_skewed$_{5\times i-1}$ as second output.

In FIG. 9, two stages of cascaded registers, each being represented by a black rectangle, arranged between $a_{5\times i-1}$ and a_skewed$_{5\times i-1}$ produce 2-clock cycle latency. The input skew buffer 103 adds sequentially, adds (A+M−1)=(1+5−1)-cycle latency to an 5-th input symbol $a_{5\times(i+1)-2-1}=a_{5\times i+2}$ to output a_skewed$_{5\times i+2}$ as 5-th output. The input skew buffer 103 further adds (M−1)=(5−1)-cycle latency to the first output a_skewed$_{5\times i-2}$, to output a_skewed$_{5\times i+3}$ as (M+1)=(5+1)-th output, additionally adds an (5−1)-cycle latency to the second output a_skewed$_{5\times i-1}$ to output a_skewed$_{5\times i-4}$ as (M+2)=(5+2)-th output, and sequentially.

The output skew buffer 106 is for arranging latencies of primary estimation results output from each DDFSE computing unit. The output skew buffer 106 adds B cycle latency (B is an integer, B>M−2) to a first input symbol a_skewed$^\sim_{iM-L}$, to output as a first output a$^\sim_{iM-L}$, adds (B−1) cycle latency to a second input symbol a_skewed$^\sim_{iM-L+1}$, to output as a second output a$^\sim_{iM-L+1}$, sequentially, adds (B−L+1) cycle latency to an L-th input symbol a_skewed$^\sim_{iM-1}$, to output as an L-th output a$^\sim_{iM-1}$. The output skew buffer 106 further adds (B−L+1) cycle latency to an (L+1)-th input symbol a_skewed$^\sim_{iM}$, to output as an (L+1)-th output a$^\sim_{iM}$, and sequentially, adds (B−M+2) cycle latency to an M-th input symbol a_skewed$^\sim_{(i+1)M-L-1}$, to output as an M-th output a$^\sim_{(i+1)M-L-1}$.

Figure 10:
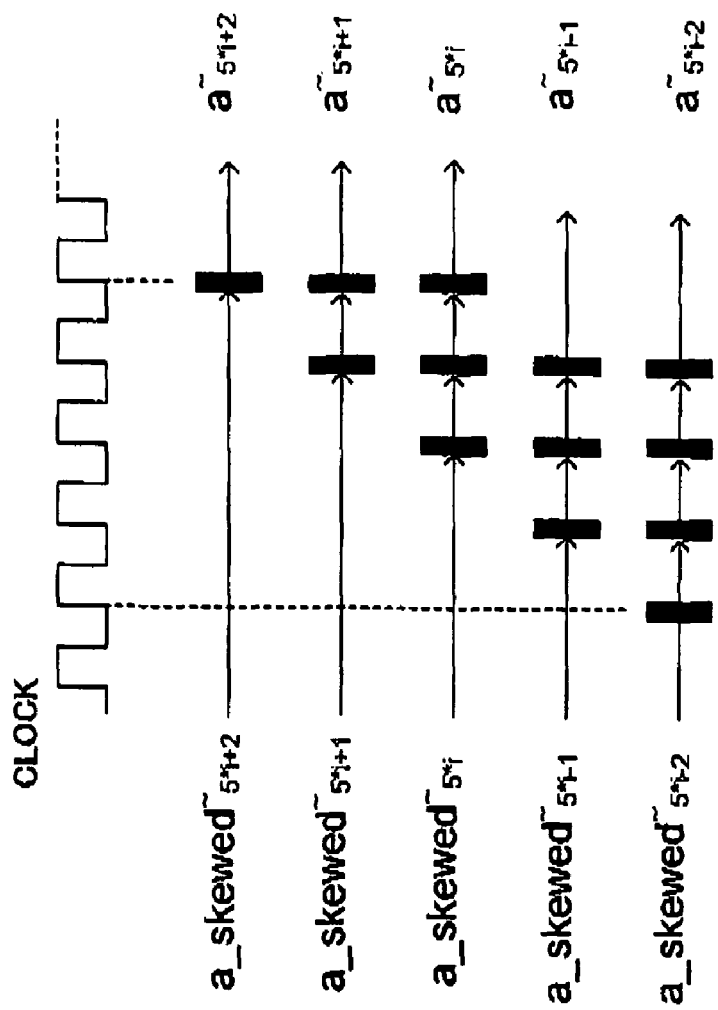
FIG. 10 is a view illustrating an example of an output skew buffer.

FIG. 10 shows a specific example of an output skew buffer with M=5, L=2, and B=4. The output skew buffer 106 adds 4 cycle latency to a first input symbol a_skewed$^\sim_{5\times i-2}$, to output as a first output a$^\sim_{5\times i-2}$. In FIG. 10, four stages of cascaded registers, each being represented by a black rectangle, arranged between a_skewed$^\sim_{5\times i-2}$ and a$^\sim_{5\times i-2}$ produce 4-clock cycle latency. The output skew buffer 106 adds (4−1) cycle latency to a second input symbol a_skewed$^\sim_{5\times i-1}$, to output as a second output a$^\sim_{5\times i-1}$. The output skew buffer 106 further adds (4−2+1) cycle latency to an (2+1)-th input symbol a_skewed$\~_{5\times i}$, to output as an (L+1)-th output a$\~_{5\times i}$, and sequentially, adds (4–5+2) cycle latency to an 5-th input symbol a_skewed$\~_{5\times i+2}$, to output as an M-th output a$\~_{5\times i+2}$.

The reason for adding a 1-cycle skew to a primary estimation result [a$\~_{iM-L}$, ..., a$\~_{iM-1}$] of a sync portion (L symbols from the start of a block), and a primary estimation result [a$\~_{iM}$, ..., a$\~_{(i+1)M-1}$] of a data portion is, as will described, to combine latencies of the primary estimation result of the sync portion and a primary estimation result of a data portion of a preceding block thereof, in order to compare the primary estimation result [a$\~_{iM-L}$, ..., a$\~_{iM-1}$] of the sync portion with a primary estimation result of a data portion of a preceding block thereof.

As described above, in case the survivor path memory unit SMU is of depth L, L-step trace back is performed to output a result of a sequence estimation, as shown in FIG. 8. If the delayed decision feedback sequence estimation is performed on a received data symbol vector [a$_{iM-L}$, ..., a$_{(i+1)M-1}$] included in an i-th block, only M skewed primary estimation results up to [a_skewed$\~_{iM-L}$, ..., a_skewed$\~_{(i+1)M-L-1}$] are able to be obtained from output of the survivor path memory unit SMU, and only M primary estimation results up to [a$\~_{iM-L}$, ..., a$\~_{(i+1)M-L-1}$] are able to be obtained from output of the output skew buffer 106.

In this example of the present invention, in order to obtain the remaining L primary estimation results [a$\~_{(i+1)M-L}$, ..., a$\~_{(i+1)M-1}$] of the block, the trace back block 105 performs L-step trace back, using a final maximum likelihood state (expressed below as $S_{L+M,i}$), after processing a final symbol a$_{(i+1)M-1}$ included in the block.

However, $S_{L+M,i}$ cannot be calculated accurately only with information included in the i-th block. The reason for this is that $S_{L+M,i}$ is a maximum likelihood state at an end of the i-th block.

In this example of the present invention, $S_{L,i+1}$ to $S_{L+M,i}$ are calculated in order to obtain $S_{L+M,i}$. That is, focusing on the fact that the final L symbols [a$_{(i+1)M-L}$, ..., a$_{(i+1)M-1}$] of the i-th block, as shown in FIG. 11, belong to both the data portion of the i-th block and the sync portion of the (i+1)-th block, and utilizing the property that a maximum likelihood state $S_{L+M,i}$ after processing the final symbol of the i-th block and a maximum likelihood state $S_{L,i+1}$ after completing computation of a$_{(i+1)M-1}$ which is the L-th symbol of the (i+1)-th block, should match, $S_{L,i+1}$ to $S_{L+M,i}$ are obtained.

Since $S_{L,i+1}$ is not a maximum likelihood state of a block end, $S_{L,i+1}$ is not subjected to an edge effect due to dividing received data into blocks and is able to be accurately derived.

Figure 11:
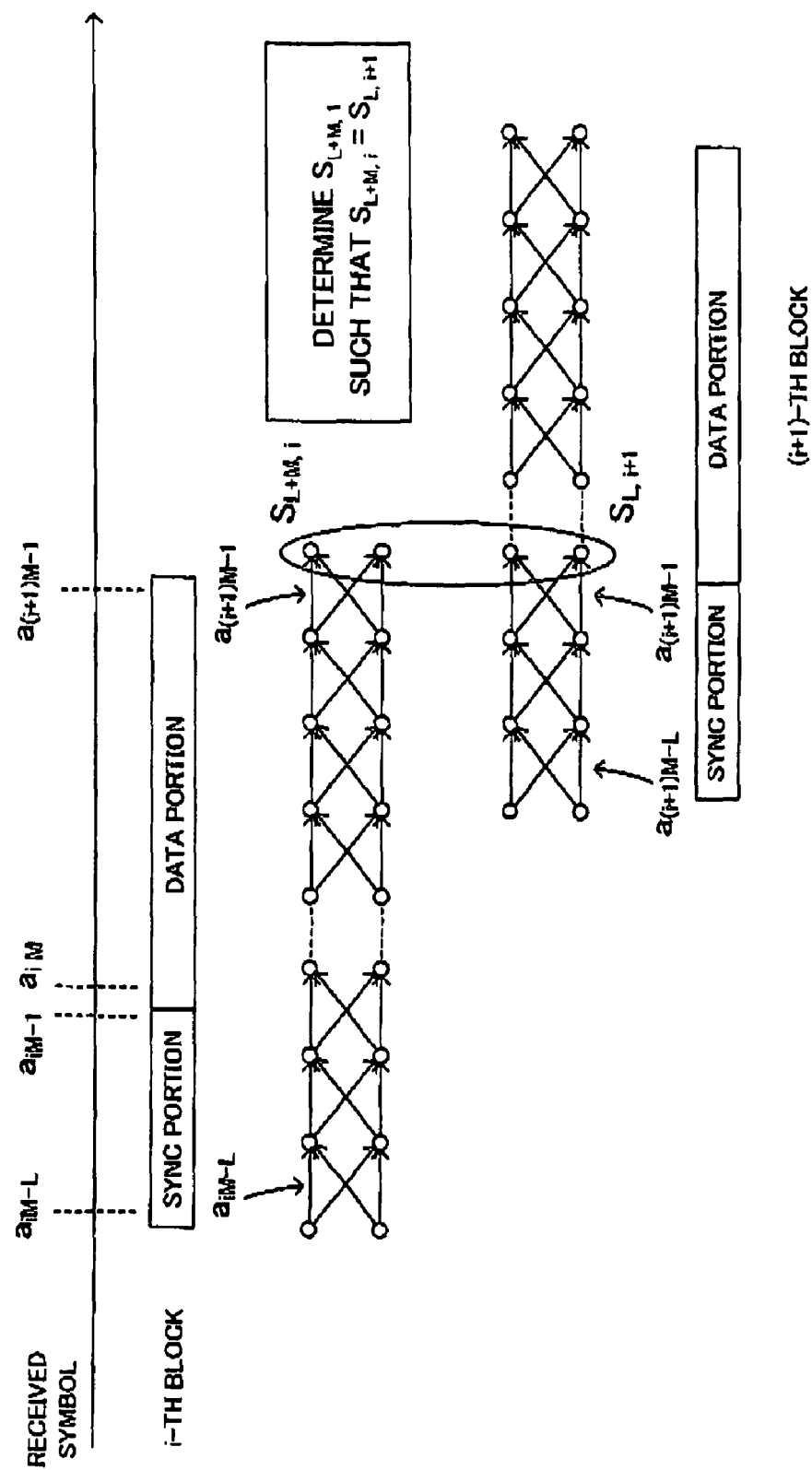
FIG. 11 is a diagram illustrating a method of obtaining a maximum likelihood state at a block end.

As an example, FIG. 11 shows a method of obtaining $S_{L+M,i}$ when the number of states of a trellis diagram is 2. L-step trace-back is a process, in which, with $S_{L+M,i}$, which is a final maximum likelihood state of the i-th block, as a starting point, a trace of maximum likelihood of an L-step portion is obtained in a past direction of a time axis, to provide output as L primary estimation results [a$\~_{(i+1)M-L}$, ..., a$\~_{(i+1)M-1}$]. This is equivalent to outputting a surviving path connected to a maximum likelihood state $S_{L+M,i}$ among content of survivor path memory unit SMU of depth L included in the (L+M)-th DDFSE computing unit.

Contrary to this example, if delayed decision feedback sequence estimation processing is performed without dividing a received symbol data sequence into a plurality of blocks, as long as processing of current received symbol data is not completed, it is not possible to start processing of subsequent received symbol data.

Figure 12:
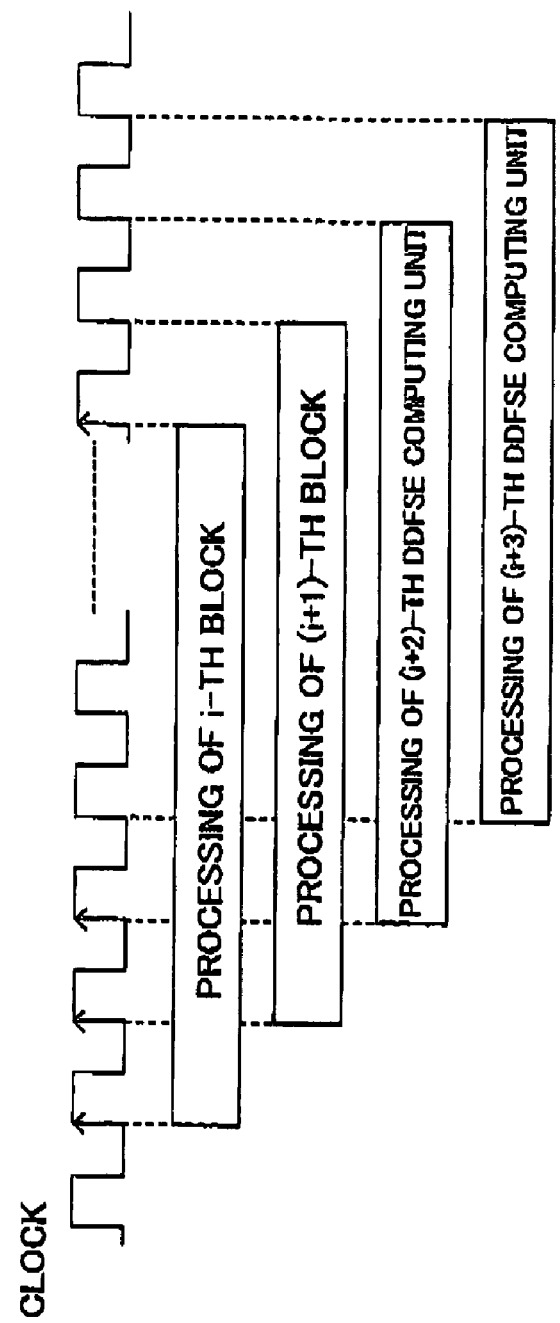
FIG. 12 is a timing chart showing start time and completion time of processing for each block.

In the delayed decision feedback sequence estimator according to this example of the present invention, the received symbol data sequence is divided into blocks of predetermined length (L+M), and performs parallel processing thereon by (L+M) DDFSE computing units, as shown in the timing chart of FIG. 12, and it is possible to start processing of a subsequent block without waiting for completion of processing of the current block. Furthermore, as shown in the timing chart of FIG. 12, the processing of one block is completed at every clock cycle and hence it become possible to raise overall processing speed, by increasing the length of data portion in the block while the clock frequency is kept constant.

Next, the operation in case an edge effect is detected in the primary estimation result will be described. For the primary estimation result [a$\~_{iM-L}$, ..., a$\~_{(i+1)M-1}$], a check is made as to occurrence of an edge effect in which there is a deterioration in error rate due to dividing into blocks to perform processing, and if an edge effect in the block is detected in the primary estimation result, the delayed decision feedback sequence estimation processing of the associated block is carried out again.

Figure 13:
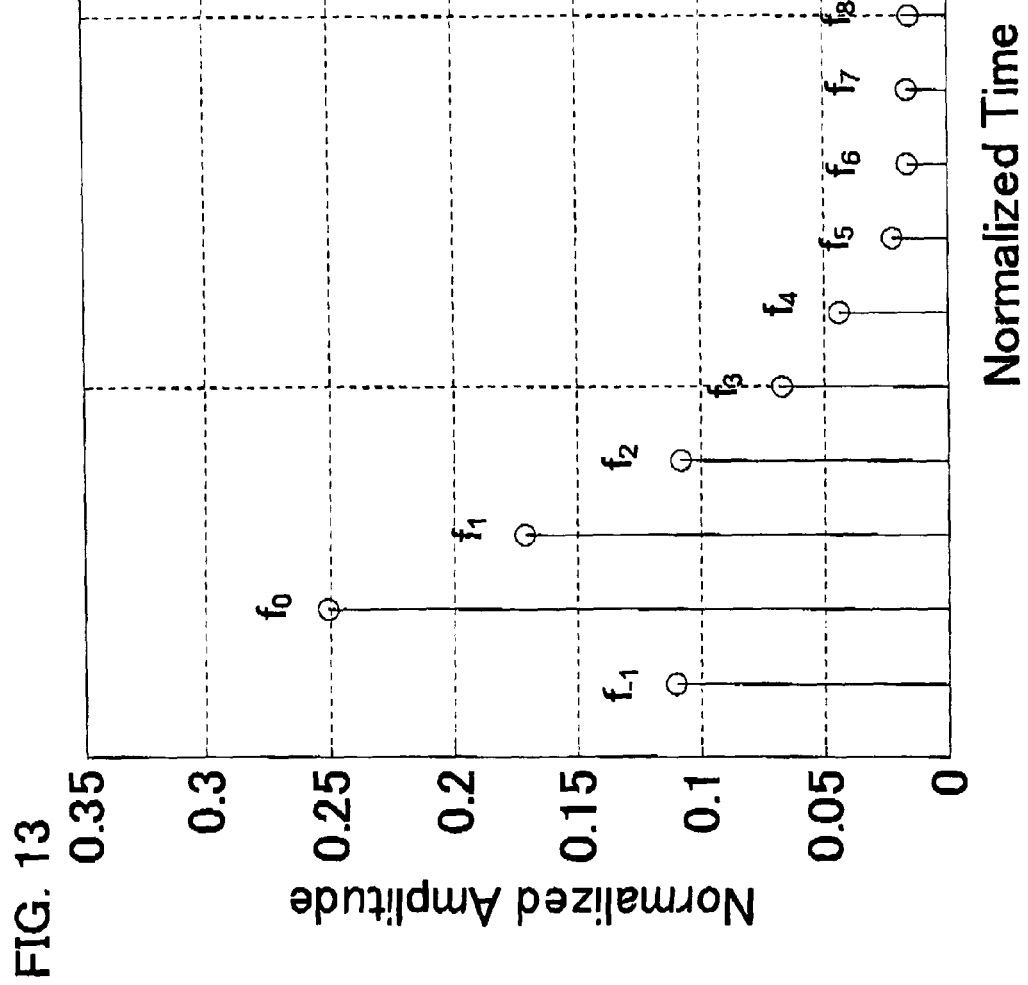
FIG. 13 is a view of an example of an impulse-response transmission line.

In case the received data symbol sequence is divided into blocks and the delayed decision feedback sequence estimation is performed for each block, information of received symbols before a leading end of the block is lost and hence the deterioration in error rate becomes large in comparison to theoretical error rate without separation into blocks. As an example, in case the delayed decision feedback sequence estimator with L=10, M=20, N=10, and the number of states=2, according to the present invention, processes data received via a transmission line having an impulse-response as shown in FIG. 13, a simulation result of bit error rate obtained from a primary estimation result [a$\~_{iM}$, ..., a$\~_{(i+1)M-1}$], and theoretical bit error rate in case of the received data sequence being processed without separation into blocks is shown in FIG. 14.

Figure 14:
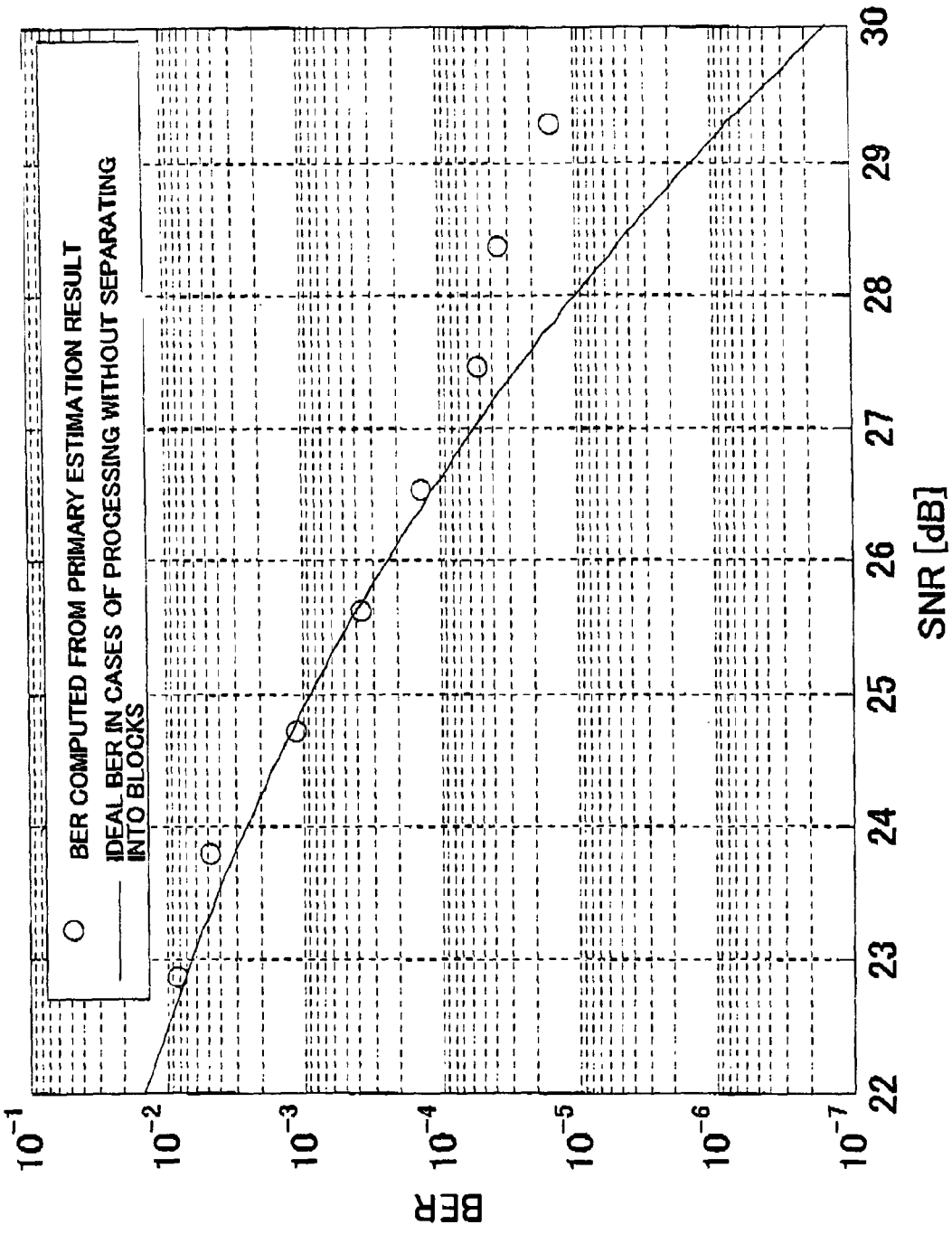
FIG. 14 is a graph representing a simulation result of computing BER using a primary estimation result.

As shown in FIG. 14, it may be understood that, with an SNR higher than around 27.5 dB, the bit error rate obtained from the primary estimation results is inferior as compared with the bit error rate, when processing is performed without separation into blocks.

Figure 15:
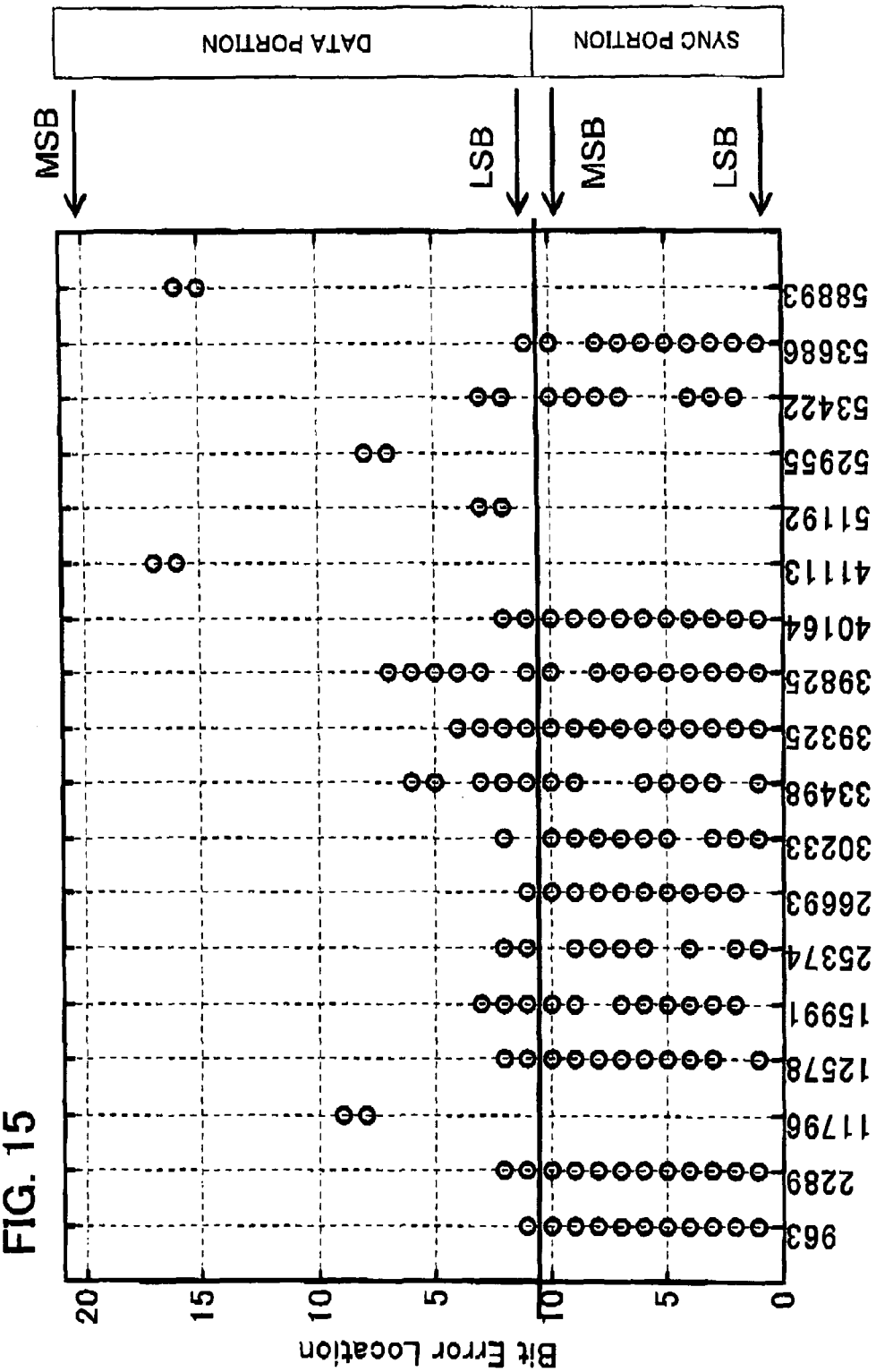
FIG. 15 is a graph showing an error type with SNR=28.4 dB in FIG. 14.

In order to observe in more detail the manner of occurrence of the bit errors which have been found in the primary estimation results with SNR=28.4 dB in FIG. 14, blocks including a bit error are extracted, and a bit position in which a bit error is found in a block of size L+M=30 is plotted as shown in FIG. 15. In FIG. 15, a horizontal-axis indicates a block index which contains bit error and a vertical axis indicates a bit position wherein a bit error is found. In the vertical axis which includes LSB to MSB of sync portion and LSB to MSB of DATA portion, a bit position attached with a circle is indicates bit position wherein a bit error is found.

From FIG. 15, there are two types of error occurrence, a bit error (hereinafter referred to as error type 1) of 1 bit or 2 continuous bits, and a bit error (hereinafter referred to as error type 2) straddling 3 or more continuous bits. In delayed decision feedback sequence estimation represented in a trellis diagram in which the number of states is 2, the number of received symbols that correspond to an error event of a minimum distance in case of additive white noise being assumed, is 2. Therefore, error type 1 may be a bit error that occurs due to the additive white noise and cannot be removed. For example, bit errors occurring in blocks of block indices 11796, 41113, 51192, 52955, and 58893 of FIG. 15 are of error type 1.

Since error type 2 is a bit error that is not due to additive white noise, it may be considered to be a bit error (edge effect) that occurs due to processing in which received data symbols are separated into blocks. For example, bit errors occurring in blocks outside of those having block indices 11796, 41113, 5192, 52955, and 58893 of FIG. 15 are edge effects.

Furthermore, from FIG. 15, as a difference between error type 1 and error type 2, it may be seen that there is a characteristic in that a bit error of error type 1 is not present in the sync portion, but that a large quantity of bit errors of error type 2 are present in the sync portion.

It can be determined whether or not an edge effect is present in a primary estimation result of a certain block by detecting whether or not a bit error is present in the primary estimation result of a sync portion of the block. Therefore, as a method of detecting and correcting an edge effect, first confirmation is made as to whether a bit error is included in the primary estimation result of the sync portion, and if a bit error is detected, delayed decision feedback sequence estimation processing of a data portion of the relevant block is carried out again.

The method of detection of a bit error included in a primary estimate result of the sync portion, as shown in FIG. 5, uses a property in that L received data symbols $[a_{iM-L}, \ldots, a_{iM-1}]$ that are a sync portion of the i-th block are identical to the final L received data symbols of a data portion of the (i−1)-th block, and therefore estimation results thereof should be identical. Specifically, in primary estimation results $[a^{\sim}_{iM-K}(i), \ldots, a^{\sim}_{iM-1}(i)]$ of the final K received data symbols $[a_{iM-K}, \ldots, a_{iM-1}]$ of a sync portion of the i-th block and primary estimation results $[a^{\sim}_{iM-K}(i-1), \ldots, a^{\sim}_{iM-1}(i-1)]$ of the final K received data symbols $[a_{iM-K}, \ldots, a_{iM-1}]$ of a data portion of the (i−1)-th block, all match and an edge effect does not occur, but if one or more of the estimation results does not match, an edge effect occurs.

Figure 16:
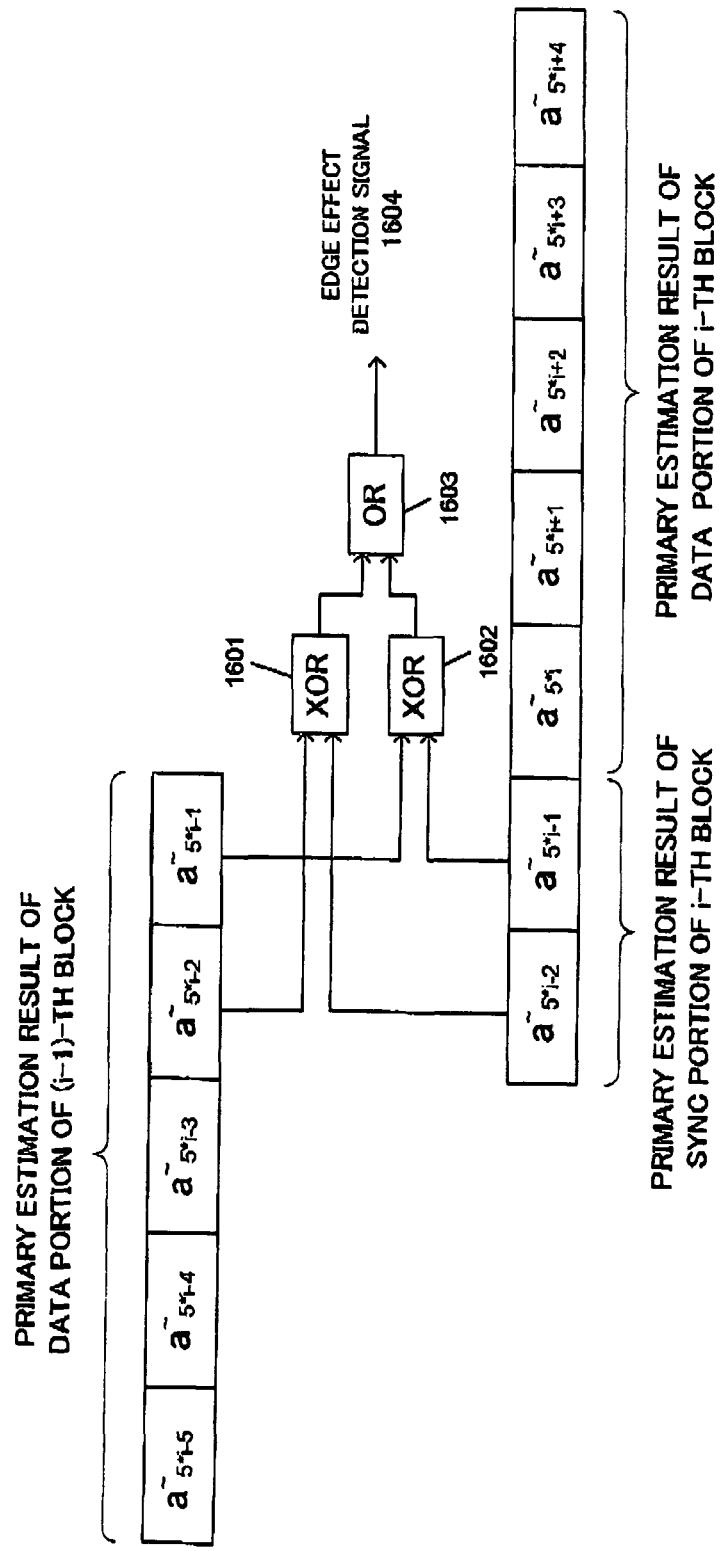
FIG. 16 is a view illustrating an example of edge effect detection.

As an example, a mechanism of edge effect detection for cases where L=2, M=5, and K=2 is shown in FIG. 16. In the example of FIG. 16, using 2 Ex-OR gates 1601 and 1602, a comparison is made of a primary estimation result of a sync portion, with a length of the i-th block being 2, and a primary estimation result of the final 2 symbols of a data portion of the (i−1)-th block, and a logical sum of these results is taken by an OR gate 1603 and is output as an edge effect detection signal. When an edge effect is detected, an edge effect detection signal 1604 goes High.

Next, a mechanism for re-processing a delayed decision feedback sequence estimation of a data portion of a relevant block, when an edge effect is detected, will be described with reference to FIG. 1, FIG. 4 and FIG. 17.

First, until delayed decision feedback sequence estimation processing is executed in each block to detect whether an edge effect is occurring in a primary estimation result, a skewed received data symbol vector 113 is held in the input FIFO memory 110. If there is an edge effect in a primary estimation result of the i-th block, the controller 402 in the error detection-correction unit 109, when an edge effect detection signal 411 becomes High, instructs the data distributor 403 to read skewed received data symbol vectors $[a\_skewed_{iM}, \ldots, a\_skewed_{(i+1)M-1}]$, that is a data portion of the block, from the input FIFO memory 110 and to sequentially supply the skewed received data symbol vectors to the DDFSE computing unit 404.

Figure 17:
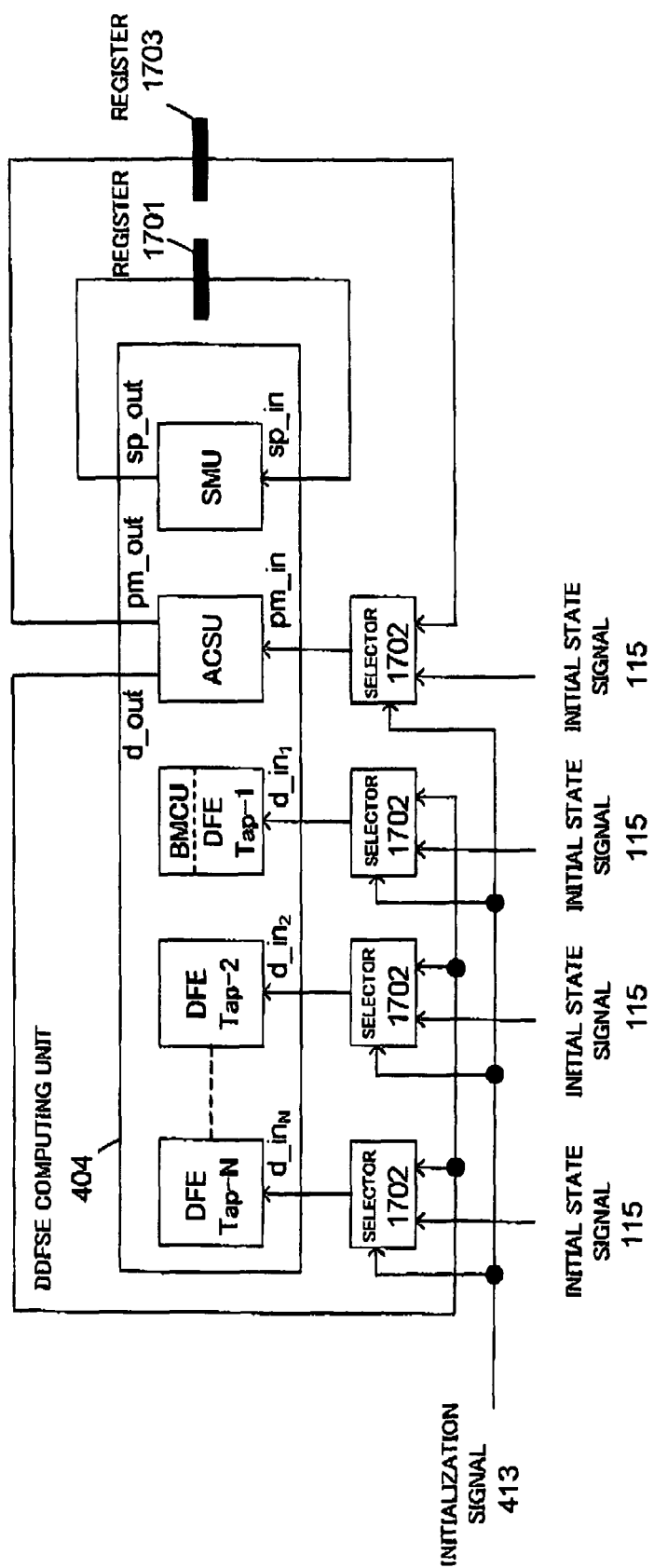
FIG. 17 is a view showing initialization of a DDFSE computing unit.

In order to prevent recurrence of a bit error that occurred in a first-time processing as a result of performing delayed decision feedback sequence estimation processing a second time on a data portion of the block, before the DDFSE computing unit 404 for error correction starts processing of an initial received data symbol $a\_skewed_{iM}$ of the data portion, a selector 1702 is operated by an initialization signal 413 from the controller 402 as shown in FIG. 17, and an internal state of the DDFSE computing unit 404 for error correction is initialized using an initial state signal 115.

The initial state signals 115 include $pm\_out_{L+M}$ that is a path metric output $pm\_out_{L+M}$ from the (L+M)-th DDFSE computing unit in the DDFSE computing unit group 104, and decision signals $d\_out_{L+M-N}$ to $d\_out_{L+M}$ from the (L+M−N)-th DDFSE computing unit to the (L+M)-th DDFSE computing unit in the DDFSE computing unit group 104. The ACSU of the DDFSE computing unit uses $pm\_out_{L+M,i+1}$ as an initial value of pm_in, and N-tap DFEs of the DDFSE computing unit use $d\_out_{L+M-N,i-1}$ to $d\_out_{L+M,i-1}$ as initial values, respectively. By this initialization processing, since it is possible to perform processing as if the data portion of the (i−1)-th block and the data portion of the i-th block were continuous without separation, when the delayed decision feedback sequence estimation processing is done for a second time, the edge effect that occurred the first time does not re-occur.

A skewed secondary estimation result $[a\_skewed^{\sim\sim}_{iM}, \ldots, a\_skewed^{\sim\sim}_{(i+1)M-1}\_L]$ output from the DDFSE computing unit 404 is supplied to an output skew butter 415, and adjustment of latency of each symbol is performed so that secondary estimation results $[a^{\sim\sim}_{iM}, \ldots, a^{\sim\sim}_{(i+1)M-1-L}]$ are outputted.

Furthermore, the trace back block 406 performs processing similar to the previously described trace-back block 105, and a secondary estimation result $[a^{\sim\sim}_{iM-1-L}, \ldots, a^{\sim\sim}_{(i+1)M-1}]$ is output. If latency from when the edge effect detection signal 411 becomes High, to the secondary estimation result being outputted, is $L_{ERROR\_CORRECTION}$, the depth of the output FIFO memory 108 is $L_{ERROR\_CORRECTION}$, and a primary estimation result is held in FIFO memory only during $L_{ERROR\_CORRECTION}$.

In case an edge effect has not been detected in a primary estimation result of a certain block, the controller 402 controls the selector 405 so as read a primary estimation result of the block from the output FIFO memory 108 to be outputted as a final estimation result, while in case an edge effect is detected in a primary estimation result $[a^{\sim}_{iM}, \ldots, a^{\sim}_{(i+1)M-1}]$ of the block, the controller 402 controls the selector 405 so at to output a secondary estimation result $[a^{\sim\sim}_{iM}, \ldots, a^{\sim\sim}_{(i+1)M-1}]$ of the block as a final estimation result.

Figure 18:
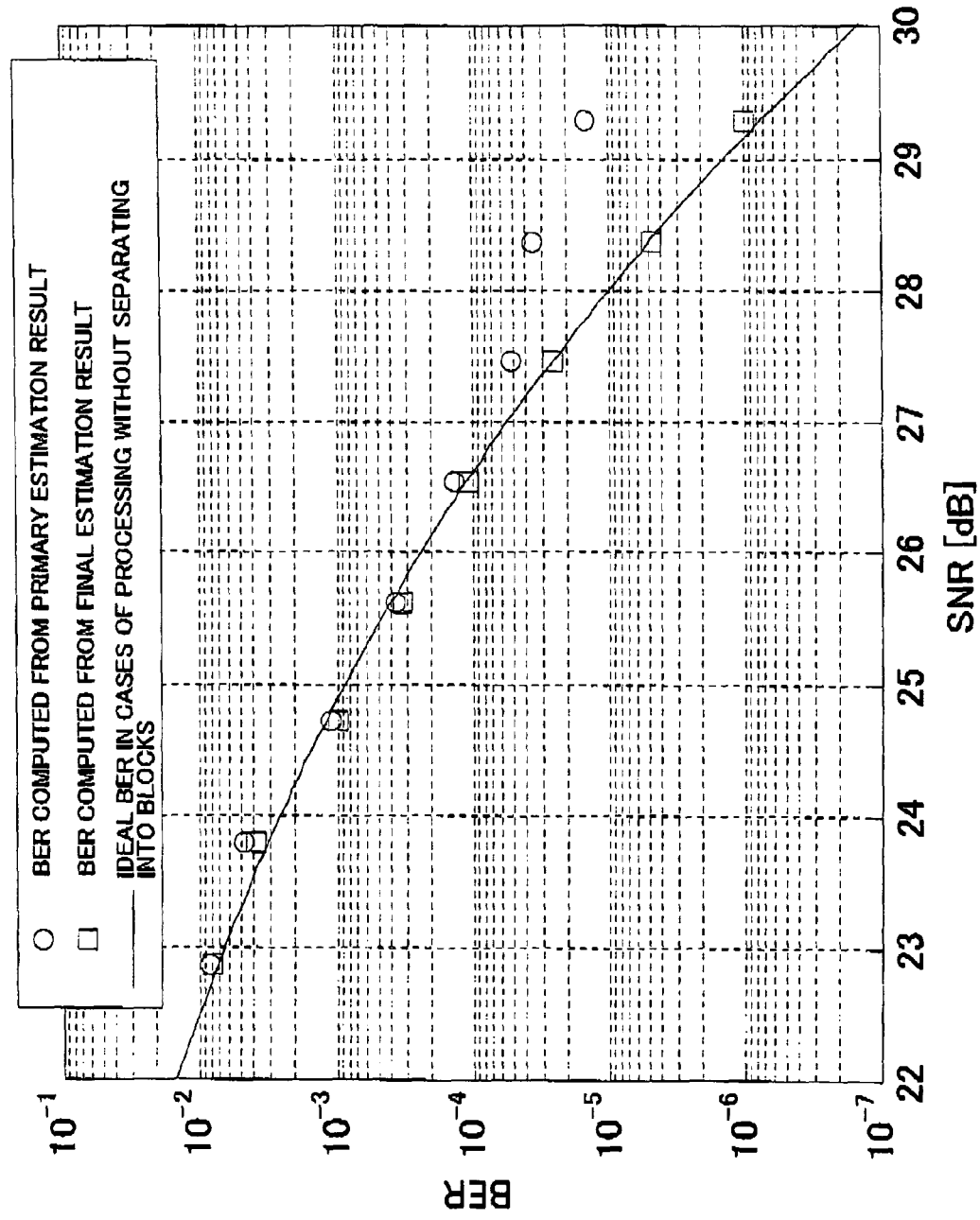
FIG. 18 is a graph showing a simulation result of computing BER using a final estimation result.

In case of processing by the delayed decision feedback sequence estimator according to the present example, which receives data, via a transmission line having an impulse-response as shown in FIG. 13, being L=10, M=20, and N=10, and with the number of states=2, a simulation result in which bit error rate is computed from a final estimation result is shown in FIG. 18.

From FIG. 18, it may be seen that although the bit error rate obtained from the primary estimation result shows deterioration from an ideal bit error rate in which processing is done without dividing into blocks, with regard to SNR in a portion higher than 27.5 [dB], the bit error rate computed from the final estimation result does not exhibit this type of deterioration.

Figure 19:
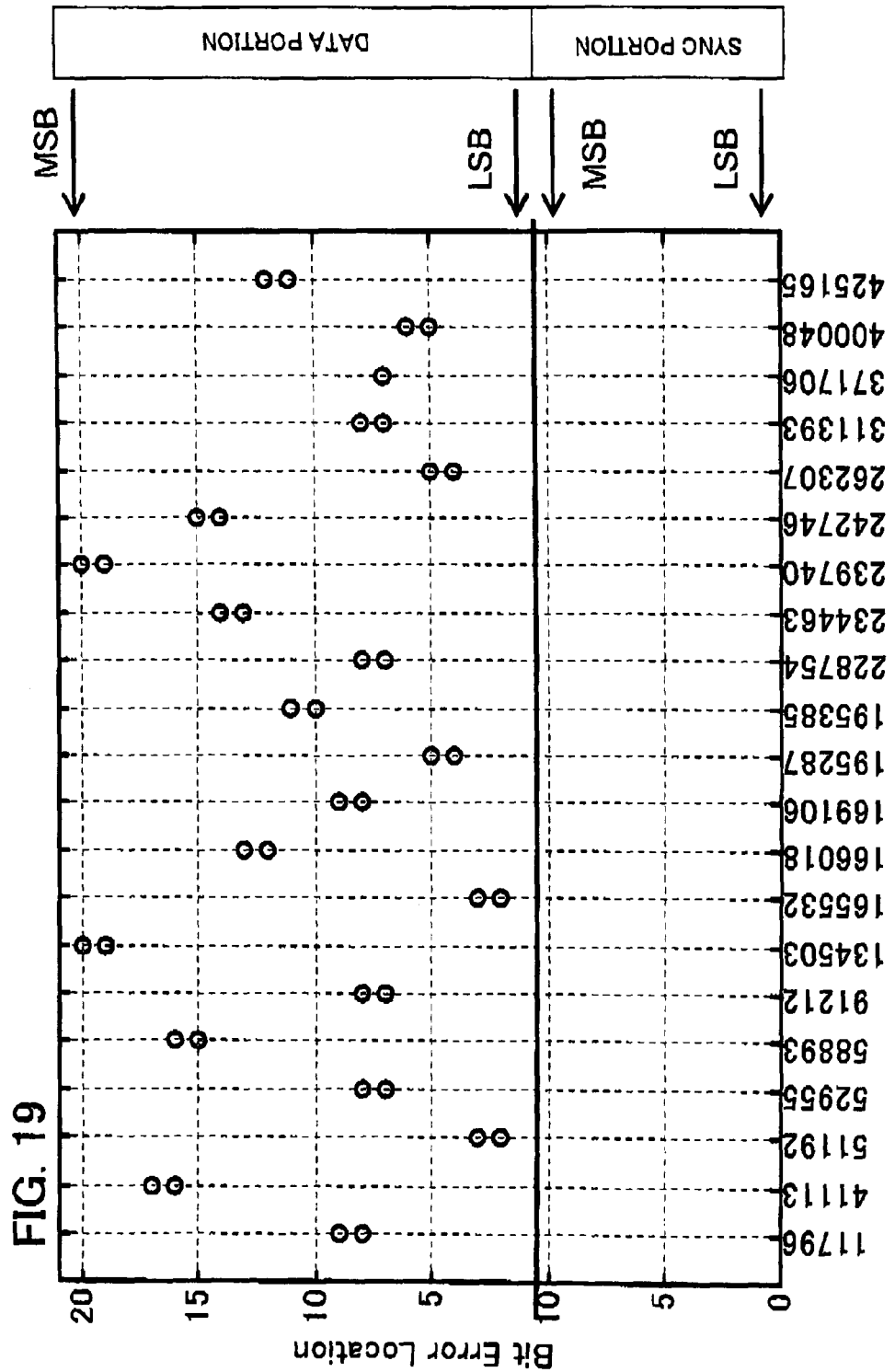
FIG. 19 is a graph showing error types with SNR=28.4 dB in FIG. 17.
Figure 20:
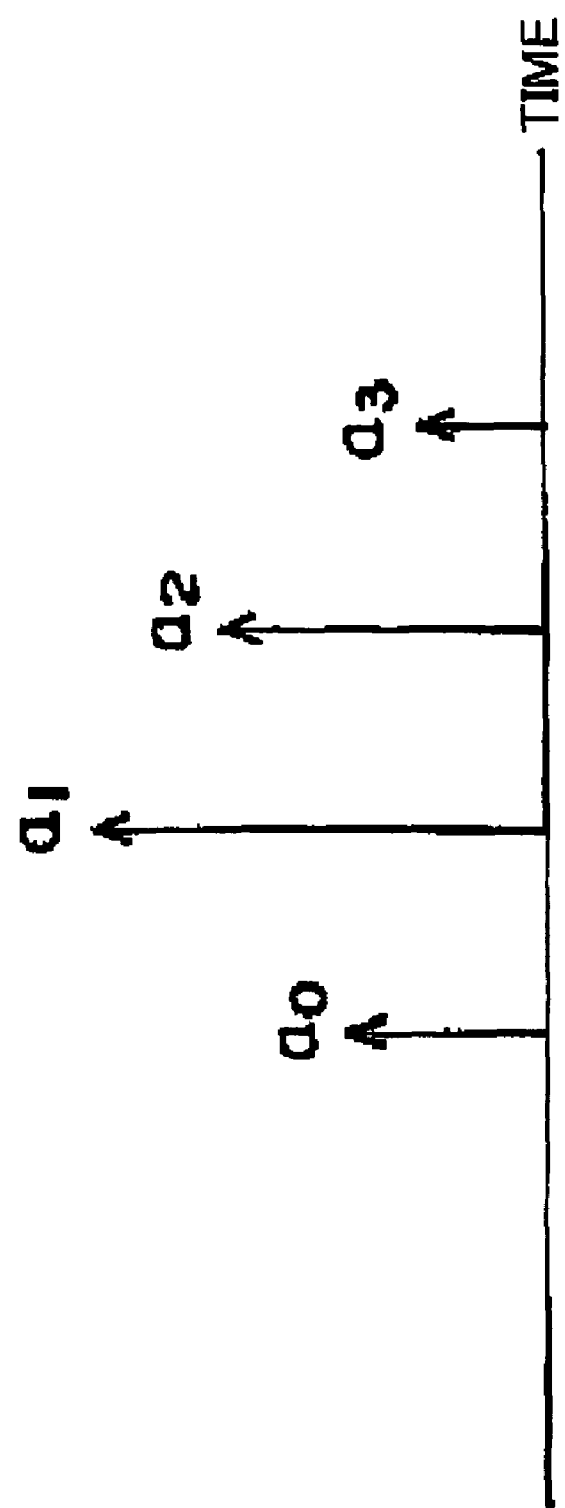
FIG. 20 is a diagram illustrating an impulse response of transmission line distortion.
Figure 21:
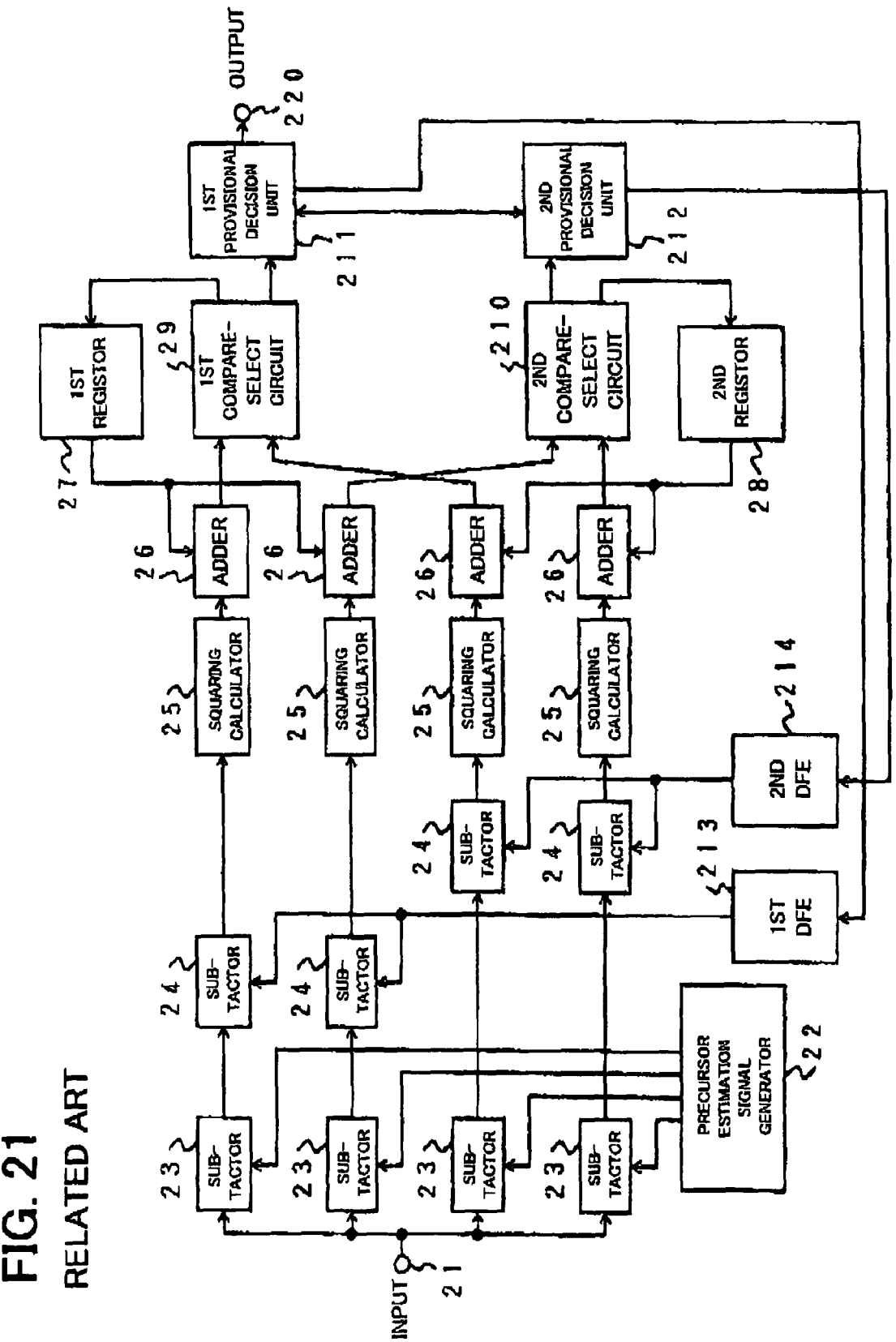
FIG. 21 is a diagram showing the configuration of the related art.
Figure 22:
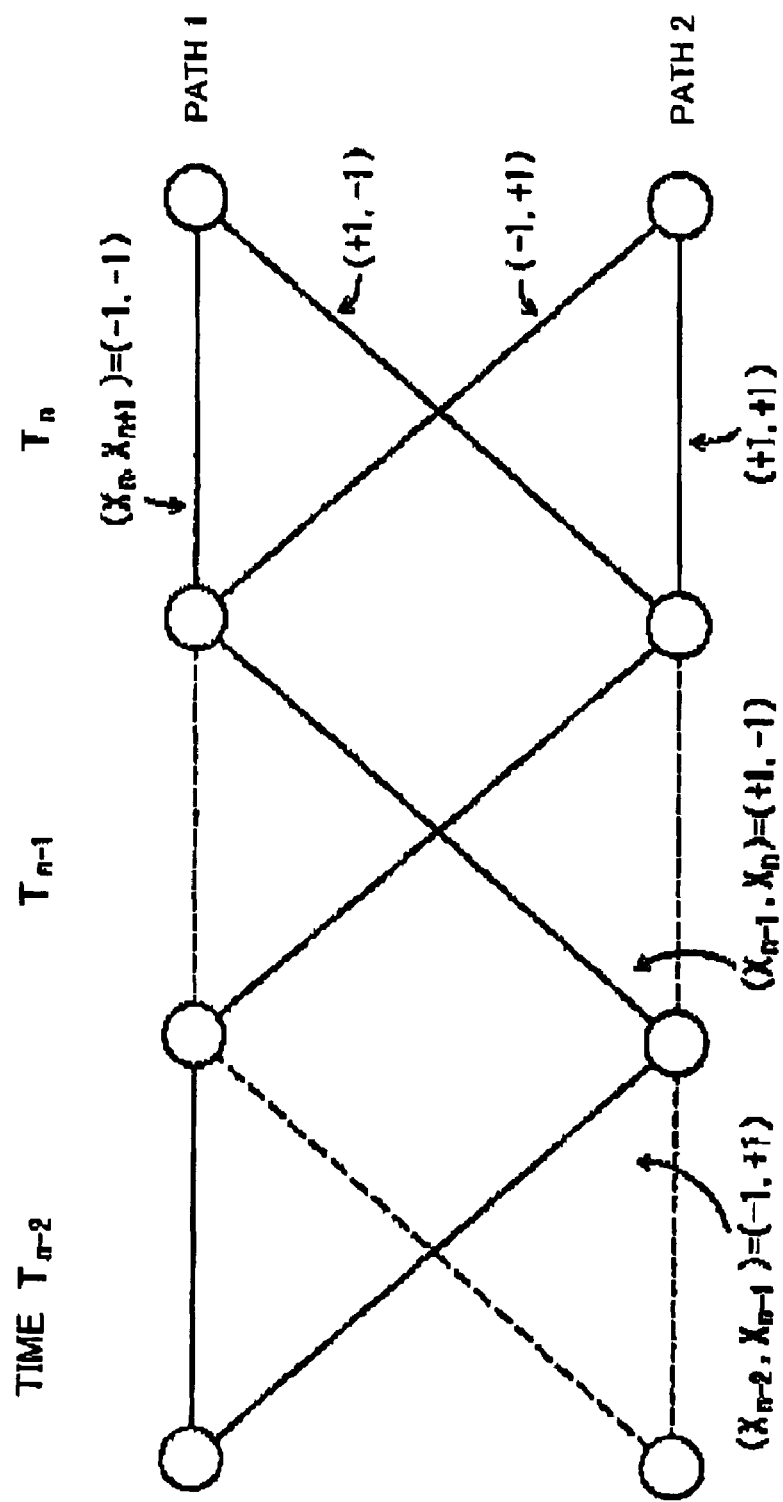
FIG. 22 is a diagram illustrating state transitions in Viterbi algorithm.
Figure 23:
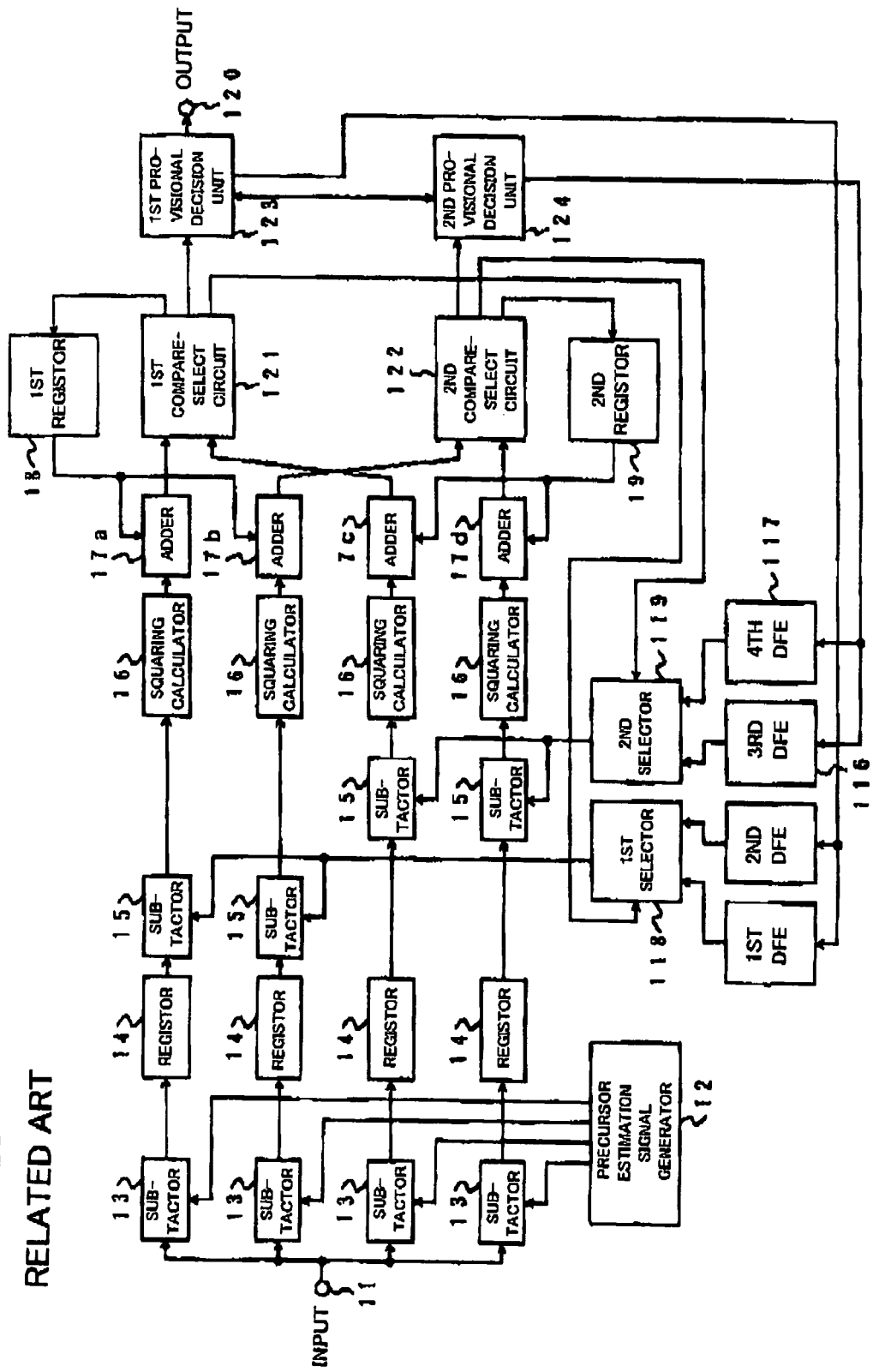
FIG. 23 is a diagram showing the configuration of the related art.

Moreover, in order to observe in more detail the manner of occurrence of the bit errors obtained from the final estimation result with SNR=28.4 dB in FIG. 18, blocks including a bit error are extracted, and a bit position in which a bit error is found in a block of size L+M=30 is plotted as shown in FIG. 19. Since only error type 1 (bit errors in one bit or 2 continuous bits) due to additive white noise is observed, it can be confirmed that an edge effect does not occur. As a result, the delayed decision feedback sequence estimator according to the example of the present invention, shown in FIG. 1 can achieve a bit error rate while separating the received data symbol sequence into blocks of a predetermined length (L+M), the same as when processing without dividing into blocks.

In this way, in the delayed decision feedback sequence estimator according to the example of the present invention, the received data symbol sequence is divided into a block of predetermined length (L+M), and by using the DDFSE computing unit group 104 in which (L+M) DDFSE computing units, each operating at a processing speed of 1/M of the received data rate, are connected in a pipeline configuration, parallel processing of the delayed decision feedback sequence estimation is performed on the (L+M) blocks. As a result, an upper bound of processing speed of the delayed decision feedback sequence estimator according to the example of the present invention, has no relation to an upper bound of processing speed of each of the DDFSE computing units, and even in case a requested received data rate exceeds the upper bound of the processing speed of each of the DDFSE computing units, by increasing the block length, a processing speed equivalent to the requested received data rate can be realized.

Furthermore, by providing a function for correcting deterioration of bit error rate at an end of the block, it is possible to achieve a bit error rate in case of separation of the received data symbol sequence into blocks being carried out, the same as in case separation into blocks is not carried out. As a result, in comparison to convention technology in which an upper bound of a received data rate that can be processing is limited by operating speed of a feedback loop, it is possible to realize a large improvement in processing speed.

It should be noted that other objects, features and aspects according to the present invention will become apparent in the entire disclosure and that modifications may be done without departing the gist and scope according to the present invention as disclosed herein and claimed as appended herewith.

Also it should be noted that any combination of the disclosed and/or claimed elements, matters and/or items may fall under the modifications aforementioned.

What is claimed is:

1. A delayed decision feedback sequence estimator, comprising:
    a DDFSE (delayed decision feedback sequence estimator) computing unit group including a plurality of DDFSE computing units, equal in number to a length of each of a plurality of blocks into which a received data symbol sequence is divided, the plurality of DDFSE computing units being connected in a pipeline configuration to execute a delayed decision feedback sequence estimation of respective blocks in parallel; and
    an edge effect detection and correction circuit that detects an edge effect due to performing the delayed decision feedback sequence estimation of the divided block and corrects a relevant bit error in the block,
    wherein each of the plurality of blocks includes (L+M) symbols, where L and M are predetermined positive integers, respectively, L corresponding to a length of a synch portion and M corresponding to a length of a data portion,
    wherein said plurality of blocks include respectively L symbols overlapped with associated succeeding/preceding blocks,
    wherein the edge effect detection and correction circuit detects an occurrence of the edge effect in a primary estimation result of the block, by comparing the primary estimation result of the synch portion of the plurality of blocks and the primary estimation result of the data portion of the preceding block,
    wherein, when detecting the edge effect in the primary estimation result of the block, the edge effect detection and correction circuit re-executes the delayed decision feedback sequence estimation of the block to generate a secondary estimation result,
    the edge effect detection and correction circuit outputting the secondary estimation result for the block with the edge effect being detected, while outputting the primary estimation result for the block without the edge effect.

2. The delayed decision feedback sequence estimator according to claim 1, wherein, when detecting the edge effect and re-executing the delayed decision feedback sequence estimation of a data portion of the block, the edge effect detection and correction circuit uses, as an initial value of a path metric for a DDFSE computing unit included therein, a path metric obtained after entire received data symbols in the block have been processed.

3. A delayed decision feedback sequence estimator, comprising:
    a DDFSE (delayed decision feedback sequence estimator) computing unit group including a plurality of DDFSE computing units, equal in number to a length of each of a plurality of blocks into which a received data symbol sequence is divided, the plurality of DDFSE computing units being connected in a pipeline configuration to execute a delayed decision feedback sequence estimation of respective blocks in parallel; and
    an edge effect detection and correction circuit that detects an edge effect by performing the delayed decision feedback sequence estimation of the divided block and corrects a relevant bit error in the block,
    wherein the received data symbol sequence is divided into the plurality of blocks, each having a same symbol length of (L+M), where L and M are predetermined positive integers, respectively, said plurality of blocks including respectively L symbols overlapped with associated succeeding/preceding blocks,
    wherein the delayed decision feedback sequence estimator further comprises:
        an input skew buffer that receives a serial to parallel converted received symbol vector and generates a skewed received symbol vector in which a received data symbol has a delay added in accordance with a relative position of the received data symbol in the vector;
        the DDFSE computing unit group including (L+M) DDFSE computing units connected in a pipeline configuration, the DDFSE computing unit group receiving the skewed received symbol vector;
        a trace back block that receives an output from the DDFSE computing unit group to perform a trace back operation; and
        an output skew buffer that receives a skewed primary estimation result output from the DDFSE computing unit group and adds a delay to respective data in accordance with a relative position of the data in the vector, a primary estimation result being generated by combining an output of the trace back block and an output of the output skew buffer.

4. The delayed decision feedback sequence estimator according to claim 3, wherein the edge effect detection and correction circuit comprises:

an input memory that temporarily holds a skewed received data symbol vector;

an output memory that temporarily holds the primary estimation result; and an error detection and correction circuit that receives the primary estimation result, an output of the output memory and an output of the input memory and checks whether or not there is a bit error related to the edge effect present in the primary estimation result, the error detection and correction circuit, in case of the bit error related to the edge effect being detected, correcting the bit error, the error detection and correction circuit outputting a final result of the delayed decision feedback sequence estimation for the received data symbol.

5. The delayed decision feedback sequence estimator according to claim 4, wherein the error detection and correction circuit includes:

an error detector that receives the primary estimation result and checks if the edge effect is occurring in the primary estimation result, the error detector, if the edge effect is detected, outputting an edge effect detection signal;

a controller that receives the edge effect detection signal;, a data distributor that receives a control signal from the controller and the received data symbol vector held in the input memory;

a DDFSE computing unit that receives the received data symbol supplied from the data distributor, and an initialization signal and an initial state signal from the controller and outputs the result of delayed decision feedback sequence estimation;

a trace-back block that receive the estimation result output from the DDFSE computing unit to perform a trace back operation;

an output skew buffer that receives the estimation result output from the DDFSE computing unit and adds a delay to respective data in accordance with a relative position of the data in the vector; and a selector that receives a combined estimation result of outputs from the trace-back block and the output skew buffer and an output from the output memory as inputs to select one of inputs based a selector control signal output from the controller.

6. The delayed decision feedback sequence estimator according to claim 5, wherein the DDFSE computing unit in the error detection and correction circuit comprises:

an N-tap decision feedback equalizer including N-taps, where N is a predetermined positive integer, the N-tap decision feedback equalizer receiving the skewed received symbol data and decision signals from an add-compare-select decision signal of one symbol before to an add-compare-select decision signal of N symbols before and being supplied with weightings;

a branch metrics computing unit that receives an output of the N-tap decision feedback equalizer;

an add-compare-select unit that receives a branch metric from the branch metrics computing unit and a path metric output from the DDFSE computing unit of the preceding stage to output updated path metric and decision signal;

a survivor path memory unit that receives the path metric output from the add-compare-select unit and a survivor path memory output from the DDFSE computing unit of the preceding stage to output an updated survivor path memory, the survivor path memory unit outputting a skewed primary estimation result;

N selectors, each receiving the decision signal from the add-compare-select unit and the initial state signal from the controller, as inputs and selecting one of the inputs using the initialization signal from the controller as a selection signal, the outputs of the N selectors being supplied to the N-taps, respectively; and a selector that receives an output from the add-compare-select unit and the initial state signal from the controller, as inputs and selects one of the inputs using the initialization signal from the controller as a selection signal, the output of the selector being supplied to the add-compare-select unit.

7. The delayed decision feedback sequence estimator according to claim 6, wherein the initial state signal includes a path metric output $pm\_out_{L+M}$ of the (L+M)-th DDFSE computing unit and N decision signals $d\_out_{L+M-N}$ to $d\_out_{L+M}$ output from (L+M−N)-th to (L+M)-th DDFSE computing units, respectively, and wherein, in the DDFSE computing unit in the error detection and correction circuit, the N decision signals $d\_out_{L+M-N}$ to $d\_out_{L+M}$ are used as respective initial values for the N-tap decision feedback equalizer U, and the path metric output $pm\_out_{L+M}$ is used as a path metric initial value of the DDFSE computing unit.

8. The delayed decision feedback sequence estimator according to claim 3, wherein the DDFSE computing unit comprises:

an N-tap decision feedback equalizer including N-taps, where N is a predetermined positive integer, the N-tap decision feedback equalizer receiving the skewed received symbol data and decision signals from an add-compare-select decision signal of one symbol before to an add-compare-select decision signal of N symbols before and being supplied with weightings;

a branch metrics computing unit that receives an output of the N-tap decision feedback equalizer;

an add-compare-select unit that receives a branch metric from the branch metrics computing unit and a path metric output from the DDFSE computing unit of the preceding stage to output updated path metric and decision signal; and a survivor path memory unit that receives the path metric output from the add-compare-select unit and a survivor path memory output from the DDFSE computing unit of the preceding stage to output an updated survivor path memory, the survivor path memory unit outputting a skewed primary estimation result.

* * * * *